(12) United States Patent
Kormann et al.

(10) Patent No.: US 12,121,099 B2
(45) Date of Patent: Oct. 22, 2024

(54) SOLES FOR SPORT SHOES

(71) Applicant: adidas AG, Herzogenaurach (DE)

(72) Inventors: Marco Kormann, Herzogenaurach (DE); Carl Arnese, Herzogenaurach (DE); Stanislav Goussev, Herzogenaurach (DE); Justin Thomas Steeds, Herzogenaurach (DE)

(73) Assignee: adidas AG, Herzogenaurach (DE)

( * ) Notice: Subject to any disclaimer, the term of this patent is extended or adjusted under 35 U.S.C. 154(b) by 292 days.

(21) Appl. No.: 17/363,987

(22) Filed: Jun. 30, 2021

(65) Prior Publication Data

US 2021/0321716 A1 Oct. 21, 2021

Related U.S. Application Data

(63) Continuation of application No. 15/195,694, filed on Jun. 28, 2016, now Pat. No. 11,076,656.

(30) Foreign Application Priority Data

Jun. 29, 2015 (DE) .................... 10 2015 212 099.6

(51) Int. Cl.
*A43B 13/18* (2006.01)
*A43B 1/00* (2006.01)
(Continued)

(52) U.S. Cl.
CPC .......... *A43B 13/186* (2013.01); *A43B 1/0009* (2013.01); *A43B 3/0078* (2013.01);
(Continued)

(58) Field of Classification Search
None
See application file for complete search history.

(56) References Cited

U.S. PATENT DOCUMENTS

| 354,693 A | 12/1886 | Dick |
|---|---|---|
| D29,749 S | 11/1898 | Bunker |

(Continued)

FOREIGN PATENT DOCUMENTS

| CN | 101611953 A | 12/2009 |
|---|---|---|
| CN | 102578760 A | 7/2012 |

(Continued)

OTHER PUBLICATIONS

German Office Action issued in DE 10 2015 212 099.6, mailed Mar. 10, 2016.

(Continued)

*Primary Examiner* — Jila M Mohandesi
(74) *Attorney, Agent, or Firm* — Sterne, Kessler, Goldstein & Fox P.L.L.C.

(57) ABSTRACT

The present invention generally relates to soles in particular midsoles for sports shoes. According to an aspect, an additively manufactured sole is provided. The sole comprises a lattice structure, the lattice structure comprising a plurality of cell elements. The sole further comprises a heel element, three-dimensionally encompassing the heel. Moreover, the sole comprises a base portion interconnecting the heel element and the lattice structure, wherein the base portion has an extension arranged to connect to a plurality of adjacent cell elements, wherein the plurality of adjacent cell elements is not positioned along an edge of the lattice structure.

20 Claims, 8 Drawing Sheets

(51) Int. Cl.
  *A43B 3/00* (2022.01)
  *A43B 7/08* (2022.01)
  *A43B 7/14* (2022.01)
  *A43B 7/1405* (2022.01)
  *A43B 7/144* (2022.01)
  *A43B 9/20* (2006.01)
  *A43B 13/02* (2022.01)
  *A43B 13/04* (2006.01)
  *A43B 13/12* (2006.01)
  *A43B 13/14* (2006.01)
  *A43B 23/02* (2006.01)
  *B33Y 80/00* (2015.01)

(52) U.S. Cl.
  CPC ............... *A43B 7/08* (2013.01); *A43B 7/141* (2013.01); *A43B 7/144* (2013.01); *A43B 9/20* (2013.01); *A43B 13/023* (2013.01); *A43B 13/04* (2013.01); *A43B 13/125* (2013.01); *A43B 13/141* (2013.01); *A43B 13/181* (2013.01); *A43B 13/188* (2013.01); *A43B 23/0215* (2013.01); *A43B 23/0245* (2013.01); *B33Y 80/00* (2014.12)

(56) References Cited

U.S. PATENT DOCUMENTS

| | | | |
|---|---|---|---|
| 1,111,437 A | 9/1914 | Butterfield | |
| D90,057 S | 5/1933 | Van Cleef | |
| D107,977 S | 1/1938 | Tousley | |
| D113,620 S | 3/1939 | Cairns | |
| D115,636 S | 7/1939 | Sperry | |
| 2,205,356 A | 6/1940 | Gruensfelder et al. | |
| D123,898 S | 12/1940 | Tousley | |
| D138,517 S | 8/1944 | Meltzer | |
| 2,853,809 A | 9/1958 | Bianchi | |
| D196,491 S | 10/1963 | Papoutsy | |
| 3,253,601 A | 5/1966 | Scholl | |
| 3,416,174 A | 12/1968 | Novitske | |
| 3,793,750 A | 2/1974 | Bowerman | |
| D241,484 S | 9/1976 | Castano | |
| D241,688 S | 10/1976 | Johnson | |
| 4,012,855 A | 3/1977 | Gardner | |
| D254,818 S | 4/1980 | Jones | |
| D255,175 S | 6/1980 | Iwakata | |
| D255,177 S | 6/1980 | Fuzita | |
| D255,178 S | 6/1980 | Fuzita | |
| D257,075 S | 9/1980 | Amicone et al. | |
| 4,271,606 A | 6/1981 | Rudy | |
| 4,297,796 A | 11/1981 | Stirtz et al. | |
| 4,309,831 A | 1/1982 | Pritt | |
| D265,605 S | 8/1982 | Batra | |
| 4,378,643 A | 4/1983 | Johnson | |
| D272,963 S | 3/1984 | Muller et al. | |
| 4,439,936 A | 4/1984 | Clarke et al. | |
| D273,631 S | 5/1984 | Ueda | |
| D278,851 S | 5/1985 | Austin | |
| D279,620 S | 7/1985 | Ueda | |
| D281,459 S | 11/1985 | Parker | |
| 4,607,440 A | 8/1986 | Roberts et al. | |
| 4,638,577 A * | 1/1987 | Riggs | A43B 13/185 36/114 |
| D288,621 S | 3/1987 | Surpuriya et al. | |
| D297,383 S | 8/1988 | Mourad et al. | |
| 4,774,774 A | 10/1988 | Allen | |
| D299,681 S | 2/1989 | Miller et al. | |
| D301,184 S | 5/1989 | Hase | |
| D301,800 S | 6/1989 | Mitsui | |
| D302,352 S | 7/1989 | Austin | |
| D303,316 S | 9/1989 | Crowley | |
| D307,817 S | 5/1990 | Schneider | |
| D312,920 S | 12/1990 | Aveni | |
| D316,324 S | 4/1991 | Rogers | |
| D321,973 S | 12/1991 | Hatfield | |
| D326,181 S | 5/1992 | Katz et al. | |
| D333,555 S | 3/1993 | Hatfield et al. | |
| D335,385 S | 5/1993 | Kawabata | |
| D335,572 S | 5/1993 | Peterson | |
| D336,775 S | 6/1993 | Smith | |
| D337,428 S | 7/1993 | Allen et al. | |
| 5,224,279 A * | 7/1993 | Agnew | A43B 13/223 36/31 |
| 5,236,637 A | 8/1993 | Hull | |
| D339,464 S | 9/1993 | Teague | |
| 5,337,492 A | 8/1994 | Anderie et al. | |
| 5,367,791 A | 11/1994 | Gross et al. | |
| D354,693 S | 1/1995 | Miller | |
| 5,391,072 A | 2/1995 | Lawton et al. | |
| 5,423,135 A | 6/1995 | Poole et al. | |
| D370,993 S | 6/1996 | Mangee | |
| 5,529,473 A | 6/1996 | Lawton et al. | |
| D384,795 S | 10/1997 | Hudson | |
| D384,796 S | 10/1997 | Smith | |
| D387,698 S | 12/1997 | Hatfield et al. | |
| D389,993 S | 2/1998 | Ryan | |
| D390,348 S | 2/1998 | Meyer et al. | |
| D390,690 S | 2/1998 | Murai et al. | |
| 5,713,140 A * | 2/1998 | Baggenstoss | A43B 13/206 36/28 |
| D391,747 S | 3/1998 | Avar | |
| D393,341 S | 4/1998 | Marshall et al. | |
| D394,342 S | 5/1998 | Schneider | |
| D394,741 S | 6/1998 | Gaudio | |
| D395,340 S | 6/1998 | Tresser | |
| D395,343 S | 6/1998 | Lozano | |
| D395,740 S | 7/1998 | Cass | |
| D395,743 S | 7/1998 | Ryan | |
| D397,546 S | 9/1998 | Merceron | |
| 5,799,417 A | 9/1998 | Burke et al. | |
| D400,345 S | 11/1998 | Teaque | |
| D401,745 S | 12/1998 | Greenberg | |
| D401,747 S | 12/1998 | Cessor | |
| D402,450 S | 12/1998 | Munns | |
| 5,862,614 A | 1/1999 | Koh | |
| D404,897 S | 2/1999 | Marshall | |
| D407,892 S | 4/1999 | Gaudio | |
| D408,972 S | 5/1999 | Greenberg | |
| D411,910 S | 7/1999 | Cessor | |
| D412,050 S | 7/1999 | Chassaing | |
| D412,239 S | 7/1999 | Sorofman | |
| 5,930,916 A | 8/1999 | Connor | |
| 5,983,529 A | 11/1999 | Serna | |
| 5,985,383 A | 11/1999 | Allen et al. | |
| 6,014,821 A | 1/2000 | Yaw | |
| D420,208 S | 2/2000 | Birkenstock | |
| 6,021,588 A | 2/2000 | Alviso | |
| 6,076,283 A | 6/2000 | Boie | |
| D432,762 S | 10/2000 | Weege | |
| D432,763 S | 10/2000 | Smith | |
| D433,215 S | 11/2000 | Smith | |
| D442,768 S | 5/2001 | Matis | |
| 6,259,962 B1 | 7/2001 | Gothait | |
| 6,367,172 B2 * | 4/2002 | Hernandez | A43B 13/186 36/103 |
| D458,441 S | 6/2002 | Gillespie | |
| D459,865 S | 7/2002 | Urie et al. | |
| D461,040 S | 8/2002 | Urie et al. | |
| D480,540 S | 10/2003 | Hoyt et al. | |
| 6,665,958 B2 | 12/2003 | Goodwin | |
| D485,662 S | 1/2004 | Dal Magro | |
| D488,916 S | 4/2004 | McClaskie | |
| 6,763,611 B1 * | 7/2004 | Fusco | A43B 13/181 36/27 |
| D497,707 S | 11/2004 | Lee | |
| D500,399 S | 1/2005 | Fuerst | |
| D515,791 S | 2/2006 | McClaskie | |
| D529,697 S | 10/2006 | Earle | |
| D536,163 S | 2/2007 | McClaskie | |
| D538,519 S | 3/2007 | McClaskie | |
| D552,337 S | 10/2007 | Parekh et al. | |
| D556,988 S | 12/2007 | Horne et al. | |
| D561,438 S | 2/2008 | Belley | |
| D561,439 S | 2/2008 | Schoenborn et al. | |

(56) References Cited

U.S. PATENT DOCUMENTS

| | | |
|---|---|---|
| D561,443 S | 2/2008 | Robinson, Jr. et al. |
| 7,383,647 B2 | 6/2008 | Chan et al. |
| D572,462 S | 7/2008 | Hatfield et al. |
| D577,883 S | 10/2008 | Link |
| 7,438,846 B2 | 10/2008 | John |
| D586,994 S | 2/2009 | Chang |
| D593,741 S | 6/2009 | Vico et al. |
| D608,991 S | 2/2010 | Lamont |
| 7,676,955 B2 | 3/2010 | Dojan et al. |
| 7,704,430 B2 | 4/2010 | Johnson et al. |
| D616,640 S | 6/2010 | Werman |
| D621,143 S | 8/2010 | Lamont |
| 7,892,474 B2 | 2/2011 | Shkolnik et al. |
| D638,616 S | 5/2011 | Gibson |
| 8,110,135 B2 | 2/2012 | El-Siblani |
| D659,358 S | 5/2012 | Van Zyll De Jong et al. |
| 8,191,284 B2 | 6/2012 | Cho |
| D666,391 S | 9/2012 | Van Zyll De Jong et al. |
| D672,949 S | 12/2012 | Bramani et al. |
| D686,402 S | 7/2013 | Portzline |
| 8,522,454 B2* | 9/2013 | Schindler ............. A43B 21/26 36/27 |
| D691,359 S | 10/2013 | Della Valle et al. |
| D695,502 S | 12/2013 | Miner |
| D696,004 S | 12/2013 | Della Valle et al. |
| D696,505 S | 12/2013 | Miner |
| D697,294 S | 1/2014 | Miner |
| D702,028 S | 4/2014 | Truelsen |
| D702,428 S | 4/2014 | Hlavacs |
| D703,425 S | 4/2014 | Lee |
| 8,739,639 B2 | 6/2014 | Owings et al. |
| D707,933 S | 7/2014 | McCourt |
| D709,274 S | 7/2014 | Roulo |
| 8,776,396 B2 | 7/2014 | Huynh |
| D711,637 S | 8/2014 | Miner |
| D713,628 S | 9/2014 | Greenspan |
| 8,914,998 B2* | 12/2014 | Gheorghian ......... A43B 13/141 36/103 |
| 8,978,272 B2* | 3/2015 | Hurd ................. A43B 7/14 36/27 |
| D741,586 S | 10/2015 | Truelsen |
| D743,154 S | 11/2015 | Nethongkome |
| D744,212 S | 12/2015 | Boudreau et al. |
| 9,205,601 B2 | 12/2015 | DeSimone et al. |
| 9,211,678 B2 | 12/2015 | DeSimone et al. |
| 9,216,546 B2 | 12/2015 | DeSimone et al. |
| D747,860 S | 1/2016 | de Costa Pereira Machado |
| D751,797 S | 3/2016 | Slimane |
| 9,320,316 B2* | 4/2016 | Guyan ................. A43B 13/125 |
| 9,453,142 B2 | 9/2016 | Rolland et al. |
| D769,593 S | 10/2016 | Chang |
| 9,480,298 B2* | 11/2016 | Barnes ................. A43B 17/003 |
| D773,162 S | 12/2016 | Lane, III et al. |
| D779,174 S | 2/2017 | de Montgolfier |
| D783,973 S | 4/2017 | Anceresi |
| D784,666 S | 4/2017 | Lok |
| D789,060 S | 6/2017 | Guyan et al. |
| D790,821 S | 7/2017 | Beers et al. |
| D792,689 S | 7/2017 | Mokos |
| D796,170 S | 9/2017 | Raysse |
| D796,806 S | 9/2017 | Durand |
| D798,561 S | 10/2017 | Ford |
| D799,184 S | 10/2017 | Chang |
| D800,432 S | 10/2017 | Klein |
| D802,896 S | 11/2017 | Rademacher et al. |
| D804,792 S | 12/2017 | De Montgolfier et al. |
| D809,752 S | 2/2018 | Campbell |
| D812,882 S | 3/2018 | Jenkins et al. |
| 9,930,929 B2 | 4/2018 | Cooper et al. |
| D816,961 S | 5/2018 | Bardea |
| D819,310 S | 6/2018 | Lashmore |
| D822,351 S | 7/2018 | DeAlmeida |
| 10,010,133 B2* | 7/2018 | Guyan ................. B29C 64/00 |
| 10,010,134 B2* | 7/2018 | Guyan ................. A43B 7/32 |
| 10,016,013 B2 | 7/2018 | Kormann et al. |
| 10,034,516 B2 | 7/2018 | Gheorghian et al. |
| D825,163 S | 8/2018 | Montross et al. |
| D825,165 S | 8/2018 | Gibson et al. |
| 10,039,343 B2 | 8/2018 | Guyan |
| D829,425 S | 10/2018 | Albrecht et al. |
| D831,315 S | 10/2018 | Mahoney |
| D831,317 S | 10/2018 | Jenkins et al. |
| 10,104,934 B2 | 10/2018 | Guyan |
| D836,892 S | 1/2019 | Jenkins et al. |
| D841,299 S | 2/2019 | Nikolic |
| D841,300 S | 2/2019 | Albrecht et al. |
| D841,301 S | 2/2019 | Albrecht et al. |
| D841,964 S | 3/2019 | Kaiserswerth |
| 10,231,511 B2 | 3/2019 | Guyan et al. |
| D844,953 S | 4/2019 | Chen et al. |
| D845,610 S | 4/2019 | Mayden et al. |
| 10,259,171 B2 | 4/2019 | Robeson et al. |
| D847,481 S | 5/2019 | Albrecht et al. |
| D848,716 S | 5/2019 | Shyllon |
| D849,382 S | 5/2019 | Jenkins et al. |
| 10,279,581 B2 | 5/2019 | Ashcroft et al. |
| D850,083 S | 6/2019 | Jenkins et al. |
| D851,873 S | 6/2019 | Maier |
| D854,300 S | 7/2019 | Evans |
| D855,957 S | 8/2019 | Evans |
| D857,350 S | 8/2019 | Hardy |
| D857,360 S | 8/2019 | Hardy |
| D857,362 S | 8/2019 | Thompson |
| D858,066 S | 9/2019 | Hatfield |
| D859,801 S | 9/2019 | Jenkins et al. |
| D860,614 S | 9/2019 | Bishoff |
| D862,051 S | 10/2019 | Goussev et al. |
| D862,866 S | 10/2019 | Albrecht et al. |
| 10,426,226 B2 | 10/2019 | Guyan et al. |
| 10,434,706 B2 | 10/2019 | Robeson et al. |
| 10,470,520 B2* | 11/2019 | Guyan ................. A43B 13/14 |
| D869,830 S | 12/2019 | Lucas et al. |
| D871,033 S | 12/2019 | Nikolic |
| D872,426 S | 1/2020 | Taylor |
| D873,546 S | 1/2020 | Henrichot |
| D876,056 S | 2/2020 | Henrichot |
| D878,016 S | 3/2020 | Henrichot |
| D879,428 S | 3/2020 | Braun et al. |
| D879,434 S | 3/2020 | Fick et al. |
| 10,575,588 B2 | 3/2020 | Perrault et al. |
| D880,120 S | 4/2020 | Fick et al. |
| D880,122 S | 4/2020 | Fick et al. |
| D880,131 S | 4/2020 | Fick et al. |
| D882,227 S | 4/2020 | Braun et al. |
| 10,639,861 B2 | 5/2020 | Minh et al. |
| D890,485 S | 7/2020 | Perrault et al. |
| 10,750,820 B2 | 8/2020 | Guyan |
| D907,904 S | 1/2021 | Perrault et al. |
| 11,116,275 B2 | 9/2021 | Tamm et al. |
| 2002/0078598 A1 | 6/2002 | Bell |
| 2004/0087230 A1* | 5/2004 | Wildeman ........... A43B 23/026 428/196 |
| 2006/0201028 A1 | 9/2006 | Chan et al. |
| 2006/0254087 A1* | 11/2006 | Fechter ................ A43B 13/183 36/27 |
| 2007/0011914 A1 | 1/2007 | Keen et al. |
| 2007/0043582 A1 | 2/2007 | Peveto et al. |
| 2008/0289218 A1 | 11/2008 | Nakano |
| 2009/0013556 A1 | 1/2009 | Nishiwaki et al. |
| 2009/0126225 A1 | 5/2009 | Jarvis |
| 2009/0139112 A1 | 6/2009 | Garneau |
| 2009/0183392 A1 | 7/2009 | Shane |
| 2009/0211114 A1* | 8/2009 | Ivester .................. A43B 21/26 36/114 |
| 2009/0293309 A1 | 12/2009 | Keating et al. |
| 2010/0122471 A1 | 5/2010 | Edington et al. |
| 2010/0170106 A1 | 7/2010 | Brewer et al. |
| 2010/0199520 A1 | 8/2010 | Dua et al. |
| 2010/0251565 A1 | 10/2010 | Litchfield et al. |
| 2010/0281714 A1 | 11/2010 | Carboy et al. |
| 2011/0099855 A1 | 5/2011 | Cho |
| 2012/0117825 A9 | 5/2012 | Jarvis |
| 2012/0167416 A1* | 7/2012 | Christensen ......... A43B 13/188 36/103 |

(56) References Cited

U.S. PATENT DOCUMENTS

| | | |
|---|---|---|
| 2012/0178259 A1 | 7/2012 | Miyazaki et al. |
| 2012/0180335 A1 | 7/2012 | Mahoney |
| 2012/0186107 A1 | 7/2012 | Crary et al. |
| 2013/0118036 A1 | 5/2013 | Gibson |
| 2013/0145653 A1 | 6/2013 | Bradford |
| 2013/0171019 A1 | 7/2013 | Gessler et al. |
| 2013/0292862 A1 | 11/2013 | Joyce |
| 2013/0295212 A1 | 11/2013 | Chen et al. |
| 2014/0020191 A1 | 1/2014 | Jones et al. |
| 2014/0026773 A1 | 1/2014 | Miller |
| 2014/0029030 A1 | 1/2014 | Miller |
| 2014/0109441 A1 | 4/2014 | McDowell et al. |
| 2014/0150297 A1 | 6/2014 | Holmes et al. |
| 2014/0182170 A1* | 7/2014 | Wawrousek ............ A43B 5/02 702/155 |
| 2014/0223783 A1 | 8/2014 | Wardlaw et al. |
| 2014/0226773 A1 | 8/2014 | Toth et al. |
| 2014/0259779 A1 | 9/2014 | Hashish et al. |
| 2014/0259787 A1 | 9/2014 | Guyan et al. |
| 2014/0259788 A1 | 9/2014 | Dojan et al. |
| 2014/0259789 A1 | 9/2014 | Dojan et al. |
| 2014/0299009 A1 | 10/2014 | Miller et al. |
| 2014/0300675 A1 | 10/2014 | Miller et al. |
| 2014/0300676 A1 | 10/2014 | Miller et al. |
| 2014/0310991 A1 | 10/2014 | Greene et al. |
| 2015/0000161 A1 | 1/2015 | Peyton et al. |
| 2015/0033577 A1 | 2/2015 | Dahl et al. |
| 2015/0033579 A1 | 2/2015 | Barnes et al. |
| 2015/0033581 A1 | 2/2015 | Barnes et al. |
| 2015/0089841 A1 | 4/2015 | Smaldone et al. |
| 2015/0128448 A1* | 5/2015 | Lockyer ............... A43B 17/14 36/28 |
| 2015/0181976 A1 | 7/2015 | Cooper et al. |
| 2015/0223560 A1* | 8/2015 | Wawrousek ........ A43B 1/0009 36/25 R |
| 2015/0245686 A1 | 9/2015 | Cross |
| 2015/0331402 A1 | 11/2015 | Lin et al. |
| 2015/0351493 A1* | 12/2015 | Ashcroft ............... A43B 5/02 36/132 |
| 2015/0360419 A1 | 12/2015 | Willis et al. |
| 2016/0051009 A1 | 2/2016 | Kormann et al. |
| 2016/0122493 A1 | 5/2016 | Farris et al. |
| 2016/0137839 A1 | 5/2016 | Rolland et al. |
| 2016/0160077 A1 | 6/2016 | Rolland et al. |
| 2016/0180440 A1 | 6/2016 | DiBenedetto et al. |
| 2016/0288376 A1 | 10/2016 | Sun et al. |
| 2016/0295971 A1 | 10/2016 | Arnese et al. |
| 2016/0324260 A1* | 11/2016 | Guyan ................. A43B 13/20 |
| 2016/0324261 A1 | 11/2016 | Guyan |
| 2016/0360828 A1 | 12/2016 | Guyan |
| 2016/0374428 A1 | 12/2016 | Kormann et al. |
| 2017/0129167 A1 | 5/2017 | Castanon |
| 2017/0129169 A1 | 5/2017 | Batchelder et al. |
| 2017/0150778 A1 | 6/2017 | Youngs et al. |
| 2017/0181496 A1 | 6/2017 | Guyan et al. |
| 2018/0014606 A1 | 1/2018 | Mokos |
| 2018/0049514 A1 | 2/2018 | Guyan et al. |
| 2018/0070736 A1 | 3/2018 | Achten et al. |
| 2018/0103719 A1 | 4/2018 | Chen |
| 2018/0126630 A1 | 5/2018 | Panzer et al. |
| 2018/0243976 A1 | 8/2018 | Feller |
| 2018/0271211 A1 | 9/2018 | Perrault et al. |
| 2018/0271213 A1 | 9/2018 | Perrault et al. |
| 2018/0290374 A1 | 10/2018 | Willis et al. |
| 2018/0303199 A1 | 10/2018 | Guyan |
| 2018/0368518 A1 | 12/2018 | Re et al. |
| 2019/0069632 A1 | 3/2019 | Meschter |
| 2019/0098960 A1 | 4/2019 | Weisskopf et al. |
| 2019/0160733 A1 | 5/2019 | Mirkin et al. |
| 2019/0223543 A1 | 7/2019 | Tamm et al. |
| 2019/0223551 A1 | 7/2019 | Hoffer et al. |
| 2019/0269200 A1 | 9/2019 | Tseng |
| 2019/0289960 A1 | 9/2019 | Loveder |
| 2019/0380439 A1 | 12/2019 | Toronjo et al. |
| 2020/0093221 A1 | 3/2020 | Caldwell et al. |
| 2020/0156308 A1 | 5/2020 | Ramos et al. |
| 2020/0329815 A1 | 10/2020 | Schmid |
| 2021/0195989 A1 | 7/2021 | Iwasa et al. |
| 2021/0195995 A1 | 7/2021 | Sakamoto et al. |
| 2022/0110406 A1 | 4/2022 | Salari-Sharif et al. |
| 2022/0110407 A1 | 4/2022 | Hettinga et al. |
| 2022/0110408 A1 | 4/2022 | Coonrod et al. |
| 2024/0032649 A1 | 2/2024 | Corcoran-Tadd et al. |

FOREIGN PATENT DOCUMENTS

| | | |
|---|---|---|
| CN | 203378623 U | 1/2014 |
| CN | 209391169 U | 9/2019 |
| CN | 209403686 U | 9/2019 |
| CN | 110859355 A | 3/2020 |
| EP | 0526892 A2 | 2/1993 |
| EP | 2 564 719 A1 | 3/2013 |
| EP | 2 424 398 B1 | 12/2015 |
| EP | 3013171 A1 | 5/2016 |
| EP | 3155917 A1 | 4/2017 |
| EP | 3165109 A1 | 5/2017 |
| EP | 2564714 B1 | 7/2018 |
| EP | 3381314 A1 | 10/2018 |
| EP | 3939462 A2 | 1/2022 |
| ES | 2 442 448 A1 | 2/2014 |
| ES | 2578730 A1 | 7/2016 |
| JP | 2002-238609 A | 8/2002 |
| JP | 2011-251190 A | 12/2011 |
| JP | 2014-151201 A | 8/2014 |
| JP | 3192899 U | 9/2014 |
| JP | 6529464 B2 | 6/2019 |
| WO | WO 2010/126708 A2 | 11/2010 |
| WO | WO 2014/008331 A2 | 1/2014 |
| WO | WO 2014/015037 A2 | 1/2014 |
| WO | WO-2014009587 A1 | 1/2014 |
| WO | WO 2014/100462 A1 | 6/2014 |
| WO | WO 2015164234 A1 | 10/2015 |
| WO | WO 2015/169941 A1 | 11/2015 |
| WO | WO 2015/169942 A1 | 11/2015 |
| WO | WO 2016/066750 A1 | 5/2016 |
| WO | WO 2017210298 A1 | 12/2017 |
| WO | WO-2021169804 A1 | 9/2021 |

OTHER PUBLICATIONS

Panetta., et al., "Elastic Textures for Additive Fabrication," ACM Transactions on Graphics 34(4), Article No. 135, (Aug. 2015).

Richard, B., Here's what 3D printed Future Craft adidas Yeezy boosts would look like Yeezys geared up for the future Retrieved from the Internet: (URL:https://solecollector.com/news/2015/11/adidas-yeezy-futurecraft-3d-print), (Year: 2015).

Tumbleston, J.R., et al., "Continuous Liquid Interface Production of 3d Objects," Science 347(6228):1349-1352, American Association for the Advancement of Science (Mar. 2015).

"adidas Breaks the Mould with 3D-Printed Performance Footwear," adidas Group, dated Oct. 7, 2015, <http://www.adidas-group.com/en/media/news-archive/pressreleases/2015/adidas-breaks-mould-3d-printed-performance-footwear/ >.

Extended European Search Report in European U.S. Appl. No. 18/164,189, dated Aug. 3, 2018, 9 pages.

Extended European Search Report in European Patent Application No. EP 16175665.5, dated Mar. 22, 2017.

Communication Pursuant to Article 94(3) for European Application No. 18164189, dated Jul. 9, 2019, 6 pages.

Green, D., "Adidas is finally bringing 3D-printed shoes into the mainstream," Business Insider.com, Dennis Green, Retrieved from the Internet: (URL: https://www.businessinsider.com/adidas-releases-futurecraft-4d-shoe-2017-4/ commerce-on-business-insider), (Year: 2017).

Januszewicz, R., et al., "Layerless Fabrication With Continuous Liquid Interface Production," Proceedings of the National Academy of Sciences of the United States of America 113(42):11703-11708, National Academy of Sciences, United States (Oct. 2016).

Nikolic, I., Reebok Flexagon Training Shoes, Behance.net, Ilija Nikolic, Retrieved from the Internet (URL: https://www.behance.

(56) References Cited

OTHER PUBLICATIONS net/gallery/68953047/REEBOK-FLEXAGON-Training-Shoes?t-racking_source=curated_galleries_list) 2018, 10 pages.

Pearson, D., "Adidas is giving Olympic athletes its first-ever 3D-printed shoes," Highsnobiety.com, Retrieved from the Internet: (URL: https://www.highsnobiety.com/2016/08/11/adidas-3d-printed-shoes-olympics/ ), (Year: 2016).

Reebok Flexagon, Retrieved from the Internet (URL: https://www.reebok.com/us/reebok-flexagon/CN2583.html ), 2018.

Worman, C., Top Tennis Shoes Featuring a 6-Month Outsole Warranty, Retrieved from the Internet (URL: https://blogs.tennisexpress.com/blogs/top-tennis-shoes-featuring-a-6-month-outsole-warranty/ ), (Year: 2018), 11 pages.

\* cited by examiner

SOLES FOR SPORT SHOES

CROSS-REFERENCE TO RELATED APPLICATIONS

This application is a continuation of U.S. application Ser. No. 15/195,694, filed Jun. 28, 2016, which application claims priority to German application 10 2015 212 099.6, filed Jun. 29, 2015, which applications are incorporated herein by reference in their entireties.

BACKGROUND OF THE INVENTION

Field of the Invention

The present invention relates to soles, in particular midsoles, for sports shoes and other types of shoes.

Background Art

Soles of shoes typically fulfill a variety of different functionalities. For example, soles can provide the foot with traction, and protect the foot from sharp objects, etc. An important functionality of soles is also to cushion the foot while at the same time a sufficient level of stability is provided.

Various sole designs and materials have been developed to specifically optimize soles in view of the mentioned functionalities. A common material used for soles in order to provide a compromise between cushioning and stability of the foot has, for example, been foamed ethylene-vinyl-acetate (EVA). More recently, the use of expanded thermoplastic polyurethane has been shown to overcome some of the drawbacks associated with EVA.

Further, additive manufacturing techniques have been used for designing parts of shoes. Generally, additive manufacturing methods allow fabricating essentially arbitrarily shaped three-dimensional objects without the need for a mold. Instead, the objects may be manufactured layer by layer e.g. from liquid material, or from a powder material. Exemplary techniques are for example, selective laser sintering, selective laser melting, selective heat sintering, stereo lithography, fused deposition modeling etc., or 3D-printing in general. Various additive manufacturing techniques related to shoes are described for example in US 2009/0126225, WO 2010/126708, US 2014/0300676, US 2014/0300675, US 2014/0299009, US 2014/0026773, US 2014/0029030, WO 2014/008331, WO 2014/015037, US 2014/0020191, EP 2 564 719, EP 2 424 398 and US 2012/0117825. Specifically, regarding soles, WO 2014/100462 for example discloses a midsole formed as a web-like structure with a plurality of elongate elements, which may provide areas of increased or decreased support, cushioning and/or stability in different regions of the midsole. US 2014/0259787 discloses a shoe including an upper and a sole coupled to the upper. The sole includes an insole, a midsole, and an outsole. The midsole includes a platform and a lattice integrally formed with the platform.

However, the known soles made by additive manufacturing have several deficiencies regarding the functional properties of the shoe sole. For example concerning stability, the known soles are hardly able to meet the requirements for soles for sports shoes, in particular for high performance sports shoes. The high-impact, cyclic loading to which sports shoes are exposed to is critical to the material behavior of e.g. laser sintered materials or other materials used in additive manufacturing. Moreover, very complex geometric structures are needed in order to vary the mechanical properties, and still the properties often could only be varied within a quite limited range.

It may therefore be considered as an object of the present invention to overcome or alleviate at least some of the deficiencies associated with known additively manufactured soles.

BRIEF SUMMARY OF THE INVENTION

According to an aspect of the present invention, this object is at least partly achieved by a sole, in particular a midsole, according to claim 1, according to claim 5, and according to claim 12.

In an example, an additively manufactured sole, in particular midsole, for a sports shoe is provided. The sole comprises a lattice structure, the lattice structure comprising a plurality of cell elements. The sole may further comprise a heel element, three-dimensionally encompassing the heel. Moreover, the sole may comprise a base portion interconnecting the heel element and the lattice structure, wherein the base portion has an extension arranged to connect to a plurality of adjacent cell elements, wherein the plurality of adjacent cell elements is not positioned along an edge of the lattice structure. It is understood that the lattice structure, the heel element and the base portion may be integrally manufactured.

The additively manufactured lattice structure may be elastic and/or viscoelastic and provide the sole with cushioning. At the same time, the heel element provides the foot with ankle support and prevents it from sliding within the shoe and/or from twisting such that a stable sole suitable for high performance sports shoes, e.g. running shoes, can be provided.

The stability of the sole may in particular be provided by the base portion interconnecting the heel element and the lattice structure, wherein the base portion has an extension arranged to connect to a plurality of adjacent cell elements, which are not positioned along an edge of the lattice structure. Hence, the heel element is interconnected with the lattice structure not e.g. via a single line of cell elements of the lattice structure along the rear edge of the lattice structure but rather the interconnection includes adjacent cell elements that may for example be arranged at a top surface of the lattice structure.

The fact that the heel element is (also) connected to the lattice structure via a plurality of adjacent cell elements not positioned along an edge of the lattice may significantly improve the transfer of lateral/medial forces and torques at the lateral and medial sides of the sole. Forces and torques may be transferred to the lattice structure via an interface with cell elements effectively arranged in two dimensions. Similarly, it may improve the transfer of forward/backward forces at the rear side of the sole via the heel element. In addition, the forces between the heel element and the lattice structure can be transferred via a larger number of cell elements such that the force per cell element, and therefore the risk of breaking, is reduced. Hence, the heel element can transfer larger forces due to the specific connection to the lattice structure. In some examples, the base portion may connect to at least three, at least five, at least ten, or at least 20 adjacent cell elements not positioned along an edge of the lattice structure.

It is understood that the extension of the base portion may be arranged to connect also to a plurality of adjacent cell elements, which are positioned along an edge of the lattice structure. In some examples, the lattice structure may e.g.

comprise a first row of cells, which are arranged at an edge, and a second, third, fourth etc. row of cells which are not arranged at that edge, but which are arranged adjacent to the first, second, third etc. row of cells, respectively, for example on the top surface or a side surface of the overall lattice structure. The base portion may have an extension arranged to connect to a plurality of adjacent cell elements positioned in the first and second row, and possibly also in the third, or up to the fourth, fifth etc. row of cells.

The lattice structure may offer a multitude of different design options such that the mechanical properties provided by the sole may be tailored as needed, e.g. the stiffness (including for example compressive strength, shear strength and/or bending strength and/or torsional stiffness), the density, the weight, the cushioning, the energy return etc. Moreover, the lattice structure may be customized as it may be fabricated by additive manufacturing methods, which do not require a mold. Hence, customized soles may be provided with short lead times. For example, the sole may be customized regarding the width and/or length of the foot, the weight of the wearer, his/her preferences regarding a tight/lose fit, and/or the type of shoe the sole is intended to be used with etc. Moreover, the integral manufacturing of the midsole using additive manufacturing makes the assembly of separate elements of the midsole unnecessary. Similarly, the additively manufactured midsole may be fabricated from single material, which may facilitate easy recycling of the midsole. It is noted that the heel element may be three-dimensionally shaped.

In some examples, a physical property, in particular a density and/or a stiffness and/or an air permeability, of the lattice structure may decrease from a rim of the sole towards a center of the sole. For example, the sole may be provided with a higher density and/or stiffness and/or a lower airpermeability around a circumference, which may assist in providing stability along the circumference of the foot, whereas towards the center of the sole, e.g. more and more cushioning is provided to provide a nice wearing comfort.

It is possible that the lattice structure comprises a plurality of struts forming the plurality of cell elements. Moreover, one or more cell elements may alternatively or additionally comprise further elements, e.g. an optional nucleus. The physical properties of the lattice structure may be adjusted by the thickness of struts of the lattice structure for example. Further, it is possible to adjust the physical properties by using cell elements with higher or lower density. Therein, for example, one or more individual cell elements may have higher or lower density (e.g. by varying a thickness of one or more struts of a cell element, and/or by varying a dimension of the optional nucleus), and/or cell elements may be arranged at smaller or larger distance with respect to each other.

In some examples, a geometry of the cell elements may be approximately constant along a thickness of the sole. For example, the geometric design (e.g., cubic, tetrahedral, dodecahedral, etc.), and/or at least one dimension of cell elements (e.g., a lateral, a longitudinal, and/or a vertical dimension), and/or a strut thickness, and/or a spacing between adjacent cell elements may be approximately constant. This may improve the provision of homogenous properties of the sole along its thickness and may improve the longevity of the lattice structure due to a homogenous force distribution within the lattice structure. In some examples, a geometry of the cell elements may be approximately constant in the entire lattice structure.

According to a further example, the lattice structure comprises a protective layer on its periphery. Such a protective layer could be created on the medial and/or lateral and/or toe and/or heal area side surfaces of the lattice structure, e.g. around a circumference of the lattice structure. Moreover, the protective layer could be created in a medial region and/or lateral region and/or heel region and/or toe region of the lattice structure. The protective layer could be a film or foil or the like, which may be integrally manufactured with the lattice structure. The protective layer may be transparent.

According to a further example, the lattice structure, the heel element and/or the base portion may be manufactured from the same class of material, in particular from polyether block amide (PEBA) or from thermoplastic polyurethane (TPU). This may allow a particularly efficient manufacturing of the sole and/or facilitate recycling of the sole. Alternatively the components may also be manufactured from polyolefins, for example polyethylene (PE), polystyrene (PS) and/or polypropylene (PP). In principle, it is possible to use an arbitrary mixture of different materials (from different classes of materials or from the same class of materials with slightly different properties) for a single lattice structure. Thus, already by combining different materials, possibly using different materials for different zones and/or regions, an arbitrary number of different functional zones may be provided.

The mentioned materials may also be recycled materials, which could be for example reclaimed polymer material, e.g. reclaimed from an ocean, especially from maritime waste. Reclaimed polymer material could be any plastic material, for example TPU, PEBA, PE, PS, PP etc. The lattice structure may be printed by using a mixture of new/virgin materials and reclaimed materials, whereby the percentage of each component can vary. In some examples, more than 50%, or more than 90% reclaimed material may be used.

By additively manufacturing, e.g. printing, the lattice structure it is possible to create different zones of the structure in different colors. Further individualization elements may directly printed in the lattice structure. Such elements could be for example names, designs or numbers.

It is possible that the lattice structure, the heel element, the base portion and/or other components are e.g. printed by using one or more materials combined to fulfil multiple performance needs in one or more single component. Several components can be directly connected to each other via additively manufacturing, e.g. printing. So there is no need for bonding, e.g. via adhesives, the components to each other.

Outsole and/or outsole components may directly be printed on the bottom side of the lattice structure. The outsole and/or outsole components could be printed from the same class of material as the lattice structure. In some examples, the material used for the outsole could comprise different properties than the material of the lattice structure. It is also possible that a different material is used for printing the outsole as is used for printing the lattice structure. Irrespective of the materials used, the outsole and the lattice structure may be printed in one manufacturing process. No bonding, e.g. via adhesives, may be necessary.

According to a further example, an additively manufactured sole, in particular midsole, for a sports shoe is provided. The sole comprises a lattice structure, the lattice structure comprising a plurality of cell sites. A majority of the cell sites may comprise interconnected cell elements. A subset of the cell sites comprises cell elements with fewer connections to at least one adjacent cell site than the majority of the cell sites and/or with a cell vacancy. For example, at a cell site of the subset, a cell element may be missing at least partly (cell vacancy). Additionally or alternatively, at a cell site of the subset, for example, an "irregular" cell element may be provided, which has fewer connections to at least one adjacent cell site than the majority of the cell sites (one or more cell disconnections). The underlying concept may be regarded as introducing deliberate cell disconnections (e.g. between adjacent cell elements) and/or cell vacancies (e.g. at least partly missing cell elements) into the lattice structure at specific cell sites.

Cell sites are understood as locations, e.g. volume elements, at which generally cell elements may be provided. For example, the plurality of cell sites may form a three-dimensional array of volume elements. For example, the plurality of cell sites may be regularly arranged. Also, the majority of cell elements may be regularly arranged within the plurality of cell sites. However, at individual cell sites, cell elements may also be omitted, at least in part, such that a cell vacancy is created at each of these cell sites.

Generally, a cell element may comprise a nucleus. The nuclei of adjacent cell elements may be connected to each other via one or more connecting elements, e.g. via one or more struts. It is noted that a cell element may also be formed by a plurality of struts, which may e.g. cross each other at one or more positions, such that a nucleus may be formed by one or more of these crossings. The remainder of the struts, e.g. those portions of the struts outside of the nucleus, may then serve as connecting elements to adjacent cell elements. At least a part of a nucleus of a cell element may be omitted, such that a cell vacancy may be formed by means of that cell element. Similarly, at least a part of one or more connecting elements, e.g. at least a part of a strut, of a cell element may be omitted, such that cell elements with fewer connections to at least one adjacent cell site than the majority of the cell sites may be formed by means of that cell element. It is noted that a cell vacancy may also be created at a cell site by providing no cell element at all at that cell site.

By means of having a subset of cell sites with fewer connections to adjacent cell elements or with a cell vacancy, the mechanical properties of the lattice structure may be varied on a very fine grained level—for example cell element by cell element—and at the same time very little complexity is added to the structure. For example, the physical properties of the lattice, e.g. its stiffness, density and/or air permeability, may thus be varied without having to change the overall lattice geometry or the lattice material. The same cell element size and/or cell site size and/or cell element design and/or the same material may be used throughout the lattice structure (or at least throughout certain regions of the lattice structure). This may greatly simplify the manufacturing, increase the yields, and at the same time allow for a regular optical appearance of the lattice structure. The properties of the lattice structure may simply be varied by means of the disconnections and/or vacancies at the cell sites belonging to the subset. For example, an overall stiffness/cushioning/air-permeability etc. may be provided by cell sites which do not belong to the subset and which may have a certain fixed number of interconnections with their respective adjacent cell sites. The cell sites of the subset may be placed in one or more regions of the lattice structure, such that the stiffness, cushioning and/or air-permeability may be altered in these regions. By placing a cell site of the subset at a certain position, the physical properties of the lattice structure may specifically varied at that cell site. On the other hand, also the bulk properties of a certain region may be altered, e.g. by varying the number of cell sites belonging to the subset within that region. In some examples, the cell sites of the subset may be regularly arranged at least within a region or zone.

It is noted that the majority of cell sites (at least the majority within a certain region of the lattice structure) may comprise cell elements with a fixed number of connections to adjacent cell sites. It may also be possible that the majority of cell sites comprises cell elements with varying numbers of connections. In that case, the cell sites of the subset may comprise fewer connections to at least one adjacent cell than—on average—the cell elements of the majority of cell sites.

At least one of the cell sites of the subset may be arranged at a surface of the lattice structure, in particular at an edge of the lattice structure. It has turned out, for example, that by placing a cell site of the subset at a surface, in particular an edge, of the lattice structure, also the strains within the lattice structure which are due to a bending or a shearing of the sole and which may lead to a breakage of the lattice structure may be reduced. Hence, the lattice structure may be more durable.

At least one of the cell sites of the subset may be arranged in a heel region of the sole. This may allow an adaptation of the sole specifically to the large forces and strains occurring in that region.

At least one but not more than 30 (e.g., at least one but not more than 15 or 10) cell sites that are not part of the subset (e.g. that are part of the majority) may be arranged in between two closest cell sites of the subset. This mix of cell sites of the subset and cell sites, which are not part of the subset, has turned out to provide maximum impact on the physical properties of the lattice structure without compromising the overall integrity and stability of the lattice structure.

The sole may further comprise one or more additively manufactured stability elements, in particular one or more side stability elements and/or one or more torsional stability elements. These additional elements may further increase the stability provided by the additively manufactured sole. For example, the stability elements may be provided as solid elements, e.g. struts, bars, stripes etc. These additional elements may be integrally fabricated with the sole.

The sole may at least partly be fabricated by means of laser sintering, e.g. selective laser sintering. This may allow a particularly flexible and cost-efficient manufacturing and at the same time may provide durable soles. In other examples, also other additive manufacturing methods may be used, e.g. selective laser melting, selective heat sintering, stereo lithography, fused deposition modeling etc., or 3D-printing in general.

The sole may comprise a polymer material, in particular a reclaimed polymer material, for example reclaimed from an ocean. Polymer material may readily be used for additive manufacturing such that soles may be efficiently manufactured. For example, PEBA and/or TPU may be used. Moreover, it has turned out that also reclaimed polymer material, for example reclaimed from an ocean may be used to provide high quality soles according to the present invention. The soles may thus be provided in an environmentally friendly manner. For example, polymer material available from the initiative "Parley for the Oceans" may be used for that matter. In some examples, the sole may be fabricated essentially entirely from said materials. The sole may be printed by using a mixture of new/virgin materials and reclaimed materials, whereby the percentage of each component can vary. In some examples, more than 50%, or more than 90% reclaimed material may be used.

In a still further example, an additively manufactured sole, in particular midsole, for a sports shoe is provided. The sole comprises a lattice structure, which comprises a plurality of interconnected cell elements. The plurality of interconnected cell elements are regularly arranged. The lattice structure may further comprise at least one cell vacancy arranged in between two or more of the plurality of interconnected cell elements (e.g., a cell element which should be present at a certain location according to the regular arrangement of the plurality of interconnected cell elements is at least partly missing). Additionally or alternatively, the lattice structure may further comprise two or more irregular cell elements, which have fewer connections to at least one adjacent cell element than each of the plurality of regularly arranged interconnected cell elements.

According to a still further example, a sole, in particular midsole, for a sports shoe, is provided. The sole comprises an additively manufactured lattice structure. The sole may further comprise a functional element that is manufactured separately from the lattice structure. The lattice structure and/or the functional element comprises at least one receptacle. The functional element and the lattice structure are mechanically attached to each other via the at least one receptacle. For example, if the lattice structure comprises a receptacle, the functional element may be mechanically attached to the receptacle.

The mechanical attachment of the functional element by means of a receptacle allows providing a sole with different components without using any adhesive and/or glue. In some examples, the at least one functional element is attached to the at least one receptacle without any glue and/or without any adhesive. Hence, potentially hazardous substances may be avoided. Moreover, providing a sole that is made from a single class of materials may be facilitated such that the sole may be more easily recycled. In addition, possible curing times of adhesives during manufacturing may be avoided. Instead, the additively manufactured lattice structure is provided with a receptacle that may be adapted to provide a durable mechanical attachment of the functional element. The one or more receptacle may be adapted such that the sole may also be used without having a connected functional element such that one or more functional elements may be connected to the sole only if needed. For example, a reinforcing element may be attached during cross-country running whereas the sole may be used without such an element when running on an athletic track. Further, functional elements may be implemented as one or more of lace loops, heel elements, lateral support elements etc.

By means of the mechanically attached functional element, two separately fabricated components may be easily joined, without chemicals, in a simple and durable, and optionally releasable manner. Hence, e.g. a dedicated stabilizing element may be attached to the lattice structure to selectively increase its stability, which may not easily be possible with an integrally fabricated stabilizing element. One or more functional elements may connected by means of one or more receptacles as described above to any of the soles described herein.

In particular, the receptacle may comprise a snap-fit and/or a snap-fasten element. Hence, the one or more functional element may be snap-fitted and/or snap-fastened to the lattice structure. This may be done e.g. at the manufacturer. However, it may also be performed by the customer who may connect one or more functional elements according to his personal taste/physiognomy and/or according to the specific intended use of the shoe to the one or more receptacle.

Moreover, a receptacle may comprise a joint around which a flap element may be rotated. In an attached positon (i.e. functional element and lattice structure being attached to each other), the flap element, in particular a surface of the flap element, faces the lattice structure of the midsole. The mentioned one or more snap-fit or snap-fasten elements may be arranged on the flap element, in particular that surface facing the lattice structure of the midsole. These may snap into one or more corresponding snap-fit or snap fasten elements that may be arranged at a surface of the lattice structure of the midsole facing the flap element in the attached position. The flap element may also be connected to the lattice structure of the midsole without a joint.

It is noted that generally, an additively manufactured functional element for a sole, in particular for a midsole, for a sports shoe may be provided. The functional element may comprise at least one receptacle. The at least one receptacle may be adapted for attaching the functional element to the sole mechanically.

The lattice structure may comprise at least one moveable element. The at least one moveable element may be integrally manufactured with the lattice structure. It may be a functional element. A moveable element may be manipulated to alter a property of the sole, like breathability or stability for example. Hence, performance needs may be fulfilled or enhanced. A moveable element may for example be arranged at the bottom of the lattice structure. A moveable element could be an opening, e.g. for venting, with an adjustable size. For example, a slideable component, e.g. a lever, could be provided which enables a wearer to adjust a size of the opening and thus a breathability provided by the sole. A movable element could also be designed as a locking mechanism to attach the sole to an upper. A moveable element may be moved from a first position into a second position. First and second positions may be fixed.

The lattice structure may comprise a polymer material, in particular a reclaimed polymer material, for example reclaimed from an ocean. For example, polymer material may readily be used for additive manufacturing such that the lattice structure may be efficiently manufactured. As examples, e.g. polyether block amide (PEBA) and/or thermoplastic polyurethane (TPU) may be used. Moreover, it has turned out that also reclaimed polymer material, for example reclaimed from an ocean may be used to provide lattice structures that meet the requirements in terms of stability and cushioning for high quality sports shoes. The lattice structures may thus be provided in an environmentally friendly manner. In some examples, the lattice structure may be fabricated essentially entirely from said materials.

The lattice structure may comprise a plurality of lattice layers. Each lattice layer may comprise a plurality of cell elements. For example, three or more lattice layers may be provided. By using a plurality of lattice layers, a large amount of cushioning may be provided. In particular, the lattice layers may be elastically deformable relative to each other such that the distance between respective two lattice layers may vary as a function of the pressure applied on the lattice structure. For example, the lattice structure may comprise a plurality of essentially horizontal lattice layers that may at least partly be stacked on top of each other. The multi-layer lattice structure may also contribute to providing stability with a relatively low weight of the lattice structure.

The lattice structure may comprise at least two regions that have different physical properties, in particular different densities, different stiffness, and/or different air permeability etc.

The lattice structure may be adapted to extend essentially across the entire foot. Hence, the lattice structure may be used to provide a certain degree of cushioning/ stiffness/air-permeability below the entire foot of the respective wearer.

The lattice structure may comprise at least one cell element shaped as a dodecahedron, in particular a rhombic dodecahedron. These cell element designs have turned out to provide lattice structures with good stability and cushioning properties and at the same time longevity. This may be attributed to the number of 12 faces of a dodecahedron, which allow a smooth force distribution amongst adjacent cell elements but at the same time still allows connections among adjacent cell elements, which are not too miniaturized. Moreover, a rhombic implementation of the dodecahedron design may further contribute to this property. For example, a cell element may comprise eight interconnections to adjacent cells.

The lattice structure may comprise at least one fluid channel extending from a top surface of the lattice structure to a bottom and/or a side surface of the lattice structure. More generally, the fluid channel may extend from any top, bottom or side surface to any of top, bottom or side surfaces. In particular, it may also extend from a first portion of a surface (e.g. in a toe region) to a second portion of that surface (e.g. in a heel region). Such a fluid channel may be used to guide a fluid between the top and bottom and/or side surfaces of the lattice structure. For example, an airflow may be guided that way. The fluid channel may be adapted such that the inflow of air is promoted, e.g. at the bottom surface and/or the side surface for the lattice structure. Thus, a sole may be provided with improved venting properties. The lattice structure may enable airflow from the medial to the lateral side, from heel to toe region and/or from the upper to the outsole. There breathability may be guaranteed in all possible directions to provide a perfectly ventilated shoe.

The lattice structure may comprise at least two cell elements with different geometry. For example, a first geometric design, e.g. cell elements designed as rhombic dodecahedrons, may be combined with other geometric designs (e.g., pentagonal dodecahedrons, cubes, cuboids, prisms, parallelepipeds, etc.). Also at least two cell elements with different dimensions may be used and/or a spacing between cell elements may differ between the first region and the second region.

The sole may comprise a solid rim element additively manufactured with the lattice structure, wherein the solid rim element circulates along a rim of the lattice structure. The solid rim element may further increase the stability of the lattice structure.

The solid rim element may comprise one or more perforations to create a transition between the solid rim element and the lattice structure. The perforations could be designed as holes cut into rim. The perforations may be integrally manufactured with the lattice structure. The perforations may be negatives of lattice structure. Further, the width and the thickness/height of the solid rim element can vary in different zones or regions. The solid rim element may serve as a bonding margin, and by e.g. varying the width of the solid rim element, the bonding margin for attaching the upper to the lattice structure may be adjusted.

The lattice structure may comprise a first region with a first plurality of cell elements having a first geometry and a second region with a second plurality of cell elements having a second geometry. For example, the geometric designs of the regions may be adapted to the specific requirements of that region. For example, a less dense cell element geometry (e.g., cubic) may be used in a region with reduced density and/or stiffness requirements. Additionally or alternatively, also one or more dimensions of the cell elements of the first plurality may differ from that of the second plurality. Moreover, a spacing between cell elements may differ between the first region and the second region.

According to a further example, a shoe with an upper and a sole according to any of the examples described herein may be provided.

An intermediate layer between midsole and upper may be provided. Such an intermediate layer could be made of an open structure material, for example an open structure textile material. The textile material could be a knit textile, e.g. a warp knit or a weft knit. For example, the weft knit could be flat knitted or circular knitted. For example, the warp knit can be an engineered knit. Besides knit textiles, woven, non-woven, braided and/or other yarn-based fabric materials may be used and/or all types of open cell meshes. In principle it is possible that the intermediate layer is attached, e.g. stitched, to the upper via Strobel lasting.

Alternatively, the sole and the upper may be directly connected to each other without an intermediate Strobel last. For example, the lattice structure of the sole may be adapted to provide a nice wearing comfort when contacting the foot of the wearer. Hence, an intermediate Strobel last and/or other intermediate layers may be avoided. As a result, a lighter and more cost-efficient shoe may be provided.

If the sole has a solid rim element, the upper may be connected to the solid rim element. In other words, the upper may be connected to the sole via the solid rim element. For example, the upper may be glued, stitched, thermally bonded etc. to the solid rim element. The upper may also be connected to the sole via infrared (IR) welding.

The upper may comprise a polymer material, in particular a reclaimed polymer material, for example reclaimed from an ocean. For example, the upper may comprise a yarn that includes the polymer material. It has turned out that such yarns may be used to provide high-quality shoes. Moreover, using a reclaimed polymer material allows providing more environmentally friendly shoes. For example, polymer material available from the initiative "Parley for the Oceans" may be used for that matter. In particular, the shoe may therefore comprise a midsole which comprises or is essentially entirely made of reclaimed polymer material, for example reclaimed from an ocean as well as and an upper that comprises reclaimed polymer material, e.g. a yarn that includes the polymer material.

The upper may be fabricated using tailored fiber placement with a yarn that comprises polymer material, e.g. reclaimed polymer material, for example reclaimed from an ocean. Concerning further details with respect to tailored fiber placement, reference is made to co-pending application DE 10 2015 205 750.8 that is incorporated by reference. It is possible that not just the fibers themselves comprise or are made from reclaimed material. In principle it is also possible that a base layer, as described in DE 10 2015 205 750.8 comprises reclaimed material as well. The upper may also be made of a mixture of new material and reclaimed material. In some examples, more than 50%, or more than 90% reclaimed material may be used.

The upper and the sole may comprise the same class of material, in particular TPU or PEBA. Thus, recycling of the shoe may be facilitated.

For collecting the reclaimed polymer material mentioned above from the ocean, a net, e.g. a fishing net, may be used. Also the net may be used for manufacturing the mentioned soles and/or uppers, which may be manufactured by using the reclaimed material. For example the net could comprise nylon or the like, which could be incorporated into the final product, e.g. the sole and/or the upper, just as the reclaimed polymer material. Accordingly, a method may be provided for manufacturing a sole and/or an upper. The method may include the step of reclaiming a polymer material from an ocean using a net. A further step may be to use the reclaimed polymer material as well as the material of the net as base material for the sole and/or the upper. In some examples, more than 50%, or more than 90% reclaimed material and net material may be used as a base material.

It is noted that the features indicated above and described further below may also be combined with each other, although—for the sake of brevity—not all possible combinations may be explicitly described herein. Moreover, it is noted that the features that are not mandatorily required for the functioning of the aforementioned examples may also be omitted. Finally, it is noted that the disclosed aspects may also be used for other sports equipment than sports shoes.

BRIEF DESCRIPTION OF THE DRAWINGS/FIGURES

Possible embodiments of the present invention will be further described in the following detailed description with reference to the following Figures:

FIGS. 1A-C show aspects of a midsole according to some embodiments;

FIGS. 2A-D show aspects of a midsole according to some embodiments;

FIG. 3A-B show aspects of a midsole according to some embodiments;

Figure 7A:
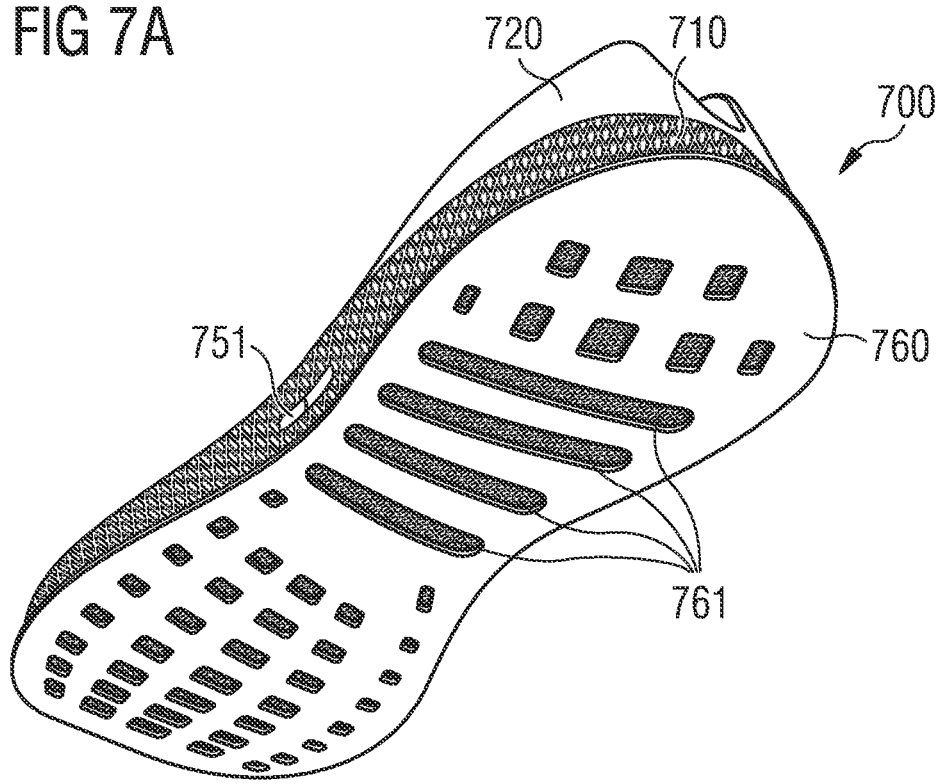
Figure 7B:
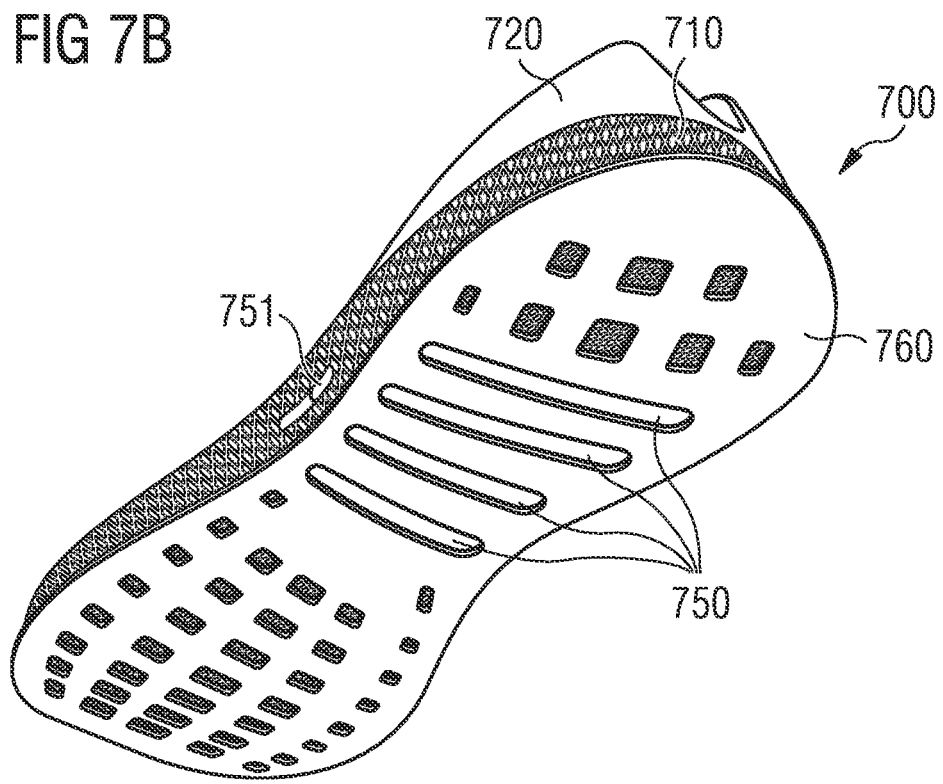
Figure 8:
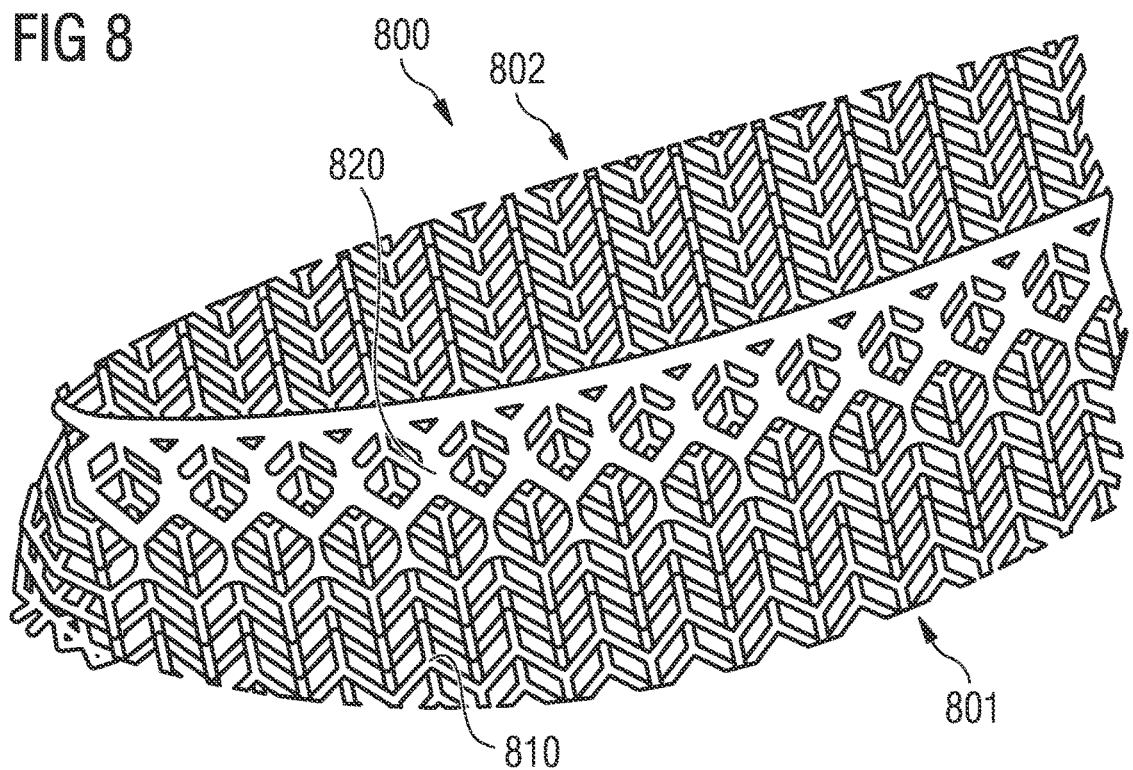
Figure 9:
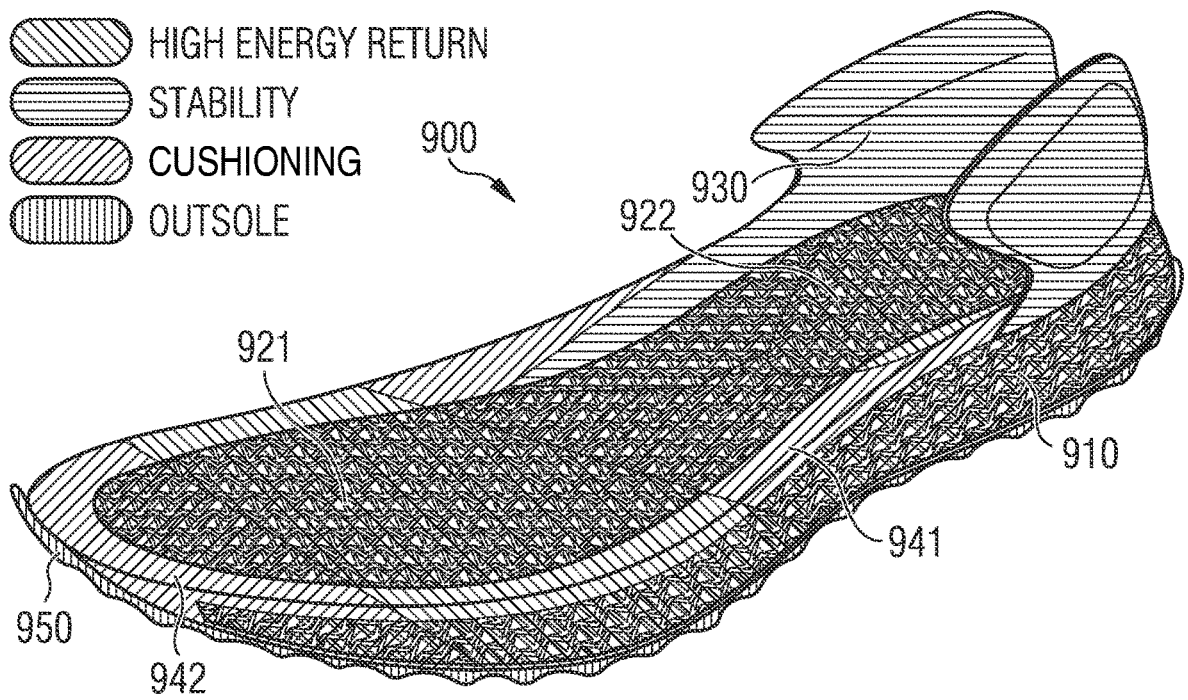

FIGS. 6A-D show aspects for a separately fabricated functional element that may be attached to a lattice structure according to some embodiments;

FIGS. 7A-B show aspects of a midsole with one or more moveable elements accordingly to some embodiments;

FIG. 8 show aspects for a lattice structure accordingly to some embodiments; and FIG. 9 shows aspects for a sole with various regions accordingly to some embodiments.

DETAILED DESCRIPTION OF THE INVENTION

It should be noted that in the following, only some possible examples of the present invention can be described in detail with reference to midsoles. The person skilled in the art readily recognizes that the specific details described with reference to these specific examples may be altered, developed further, combined in a different manner and that certain aspects of the specific examples described in the following may also be omitted. Moreover, it is noted that various aspects described in the subsequent detailed description may be combined with aspects described in the above summary section.

Figure 1A:
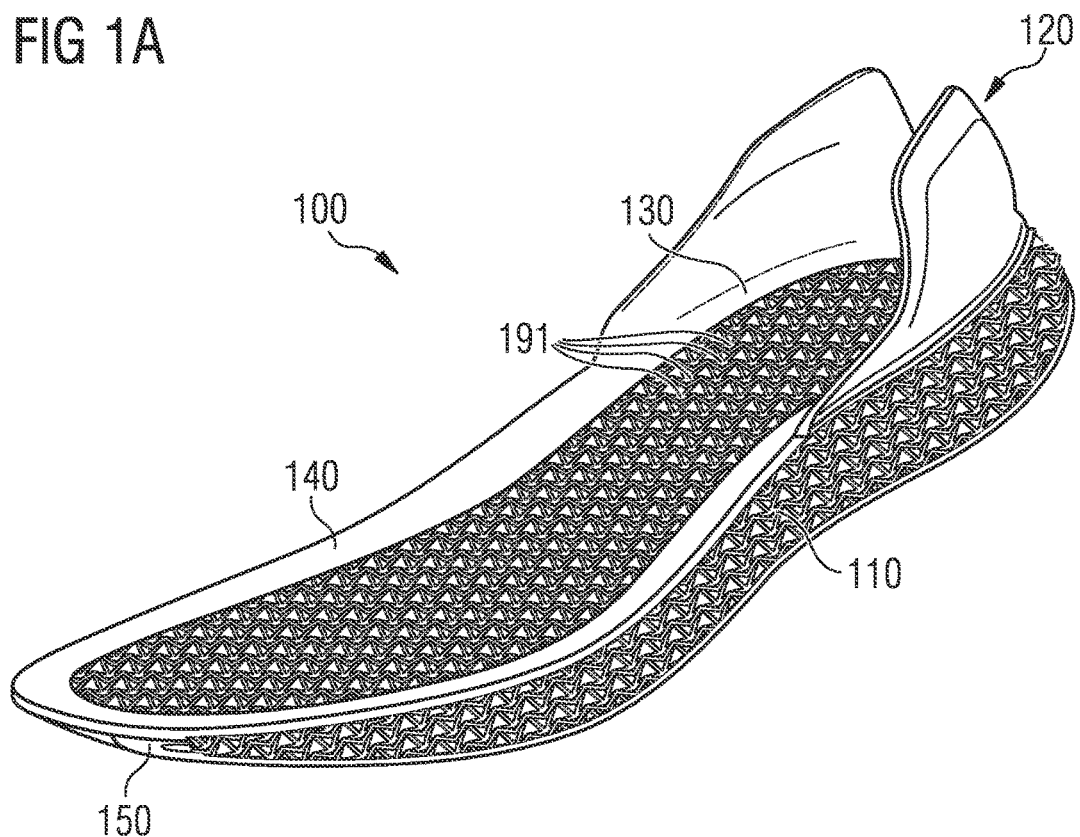
Figure 1B:
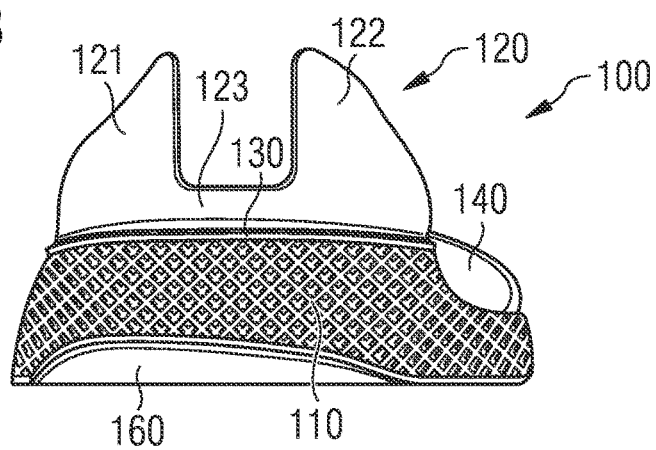
Figure 1C:
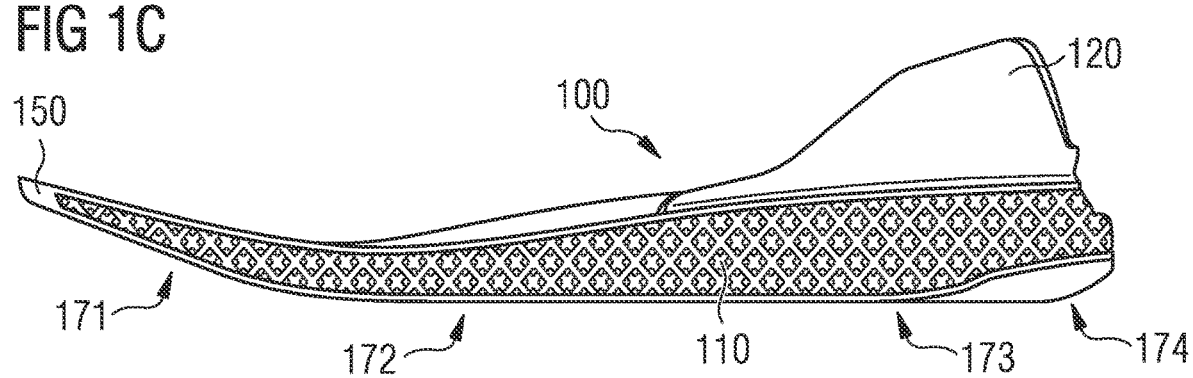

FIGS. 1A-C show perspective, rear and side views of a first embodiment of a midsole 100 according to the present invention. The midsole 100 comprises a lattice structure 110 having a plurality of cell elements 191, a heel element 120, which three-dimensionally encompasses the heel, and a base portion 130 interconnecting heel element 120 and lattice structure 110. Base portion 130 has an extension arranged to connect to a plurality of adjacent cell elements 191. The plurality of cell elements 191 includes a first plurality of adjacent cell elements 191 positioned along an edge of the lattice structure 110, as well as a second plurality of adjacent cell elements 191 not positioned along the edge of the lattice structure 110. The first and second pluralities of adjacent cell elements 191 are arranged adjacent to each other. Since base portion 130 is connected to a plurality of adjacent cell elements 191 not positioned at the edge of lattice structure 110 (in addition to the plurality of adjacent cell elements 191 positioned at the edge of lattice structure 110), forces and torques may be transferred to the lattice structure via an interface with cell elements 191 effectively arranged in two dimensions. This not only improves the transfer of forces and torques such that heel element 120 is able to provide increased stability. It also reduces the forces and torques that need to be transferred per cell element 191. Hence, the individual cell elements 191 are less susceptible to breaking.

Lattice structure 110 comprises a plurality of cell sites. A majority or all of the cell sites may be regularly arranged. A majority or all of the cell sites may comprise essentially identical cell elements 191. Alternatively, different cell elements 191 and/or a different cell site arrangement may be provided in different regions of lattice structure 110. Thus, different mechanical properties may be provided by lattice structure 110 in different regions.

Heel element 120 may be three-dimensionally shaped such that it can be adapted to the heel of a wearer and/or the expected force profile. In particular, the heel element 120 may be tapered, as e.g. shown in FIG. 1A. Heel element 120 may become thicker from a top side of the heel element 120 towards the base portion 130 connecting it to the lattice structure 110.

Moreover, as illustrated in the example of FIG. 1B, heel element 120 may also be shaped with a specific pattern around the circumference of the heel. Heel element 120 may comprise two elevated portions 121 and 122, which are arranged at the lateral and medial sides of the heel, respectively. Moreover, heel element 120 may comprise a lower portion 123 arranged at a rear side of the heel. The combination of elevated portions 121 and 122 at lateral and medial sides with lower portion 123 at the rear side of the heel may help to provide a large degree of stability, especially in relation to lateral movements. Simultaneously, the pressure exerted by heel element 120 on the sensitive rear side of the heel, which is particularly susceptible to pressure marks or blisters, may thus be minimized. In other examples, heel element 120 may also have an elevated portion at the rear side of the heel and/or each of the elevated portions 121 and 122 may also individually be implemented as lower portions or comprise lower sections as needed.

Midsole 100 may also comprise a solid rim element 140 such as depicted in FIG. 1A. Solid rim element 140 may circulate along a rim of the top surface of lattice structure 110, e.g. extending from a medial side of base portion 130 along the rim of the midfoot and forefoot as well as toe regions of the sole until a lateral side of base portion 130. Additionally or alternatively, solid rim element 140 may be provided sideways along the rim of lattice structure 110. Solid rim element 140 may not be three-dimensionally shaped. Instead, it may be provided as a flat stripe with essentially identical thickness throughout its various regions. Alternatively, solid rim element 140 may at least in part also be three-dimensionally shaped. For example, solid rim element 140 may comprise a thicker cross-section at the lateral and/or medial sides of the midfoot region such that increased stability may be provided by solid rim element 140, in these locations. Additionally or alternatively, solid rim element 140 may comprise a wedged cross-section at the lateral and/or medial sides of the midfoot region to provide a graded degree of stability, there. Also in other regions, solid rim element 140 may be three-dimensionally shaped. Solid rim element 140, as depicted in FIG. 1A, may not comprise a lattice structure, but instead be implemented as a continuous strip of material. In some examples, solid rim element 140 may increase the stability of sole 100 around its rim. Alternatively or additionally, solid rim element 140 may serve as a means for supporting the attachment of sole 100 to an upper.

The solid rim element 140 may comprise one or more perforations to create a transition between solid rim element 140 and lattice structure 110. The perforations could be designed as holes cut into solid rim element 140. The perforations may be integrally manufactured with the lattice structure 110 and may be negatives of lattice structure 100. As explained, the width and the thickness of the rim can vary in different zones and/or regions.

Sole 100 may also comprise a solid front portion 150. Solid front portion 150 may not comprise any lattice structure. Rather, it may be implemented as a continuous element. It may be arranged at the front tip of sole 100. For example, it may extend from the front tip of the sole towards the rear side of sole 100 by a length of 3 mm to 25 mm, or 5 mm to 15 mm. It may extend from a top surface of sole 100 towards a bottom surface of sole 100 and/or from the lateral side of sole 100 to the medial side of sole 100. Solid front portion may be provided to increase the stability of sole 100 in the toe region, which is the last point of contact with ground during running and thus has to withstand large forces, especially when accelerating or decelerating.

As shown in FIG. 1B, sole 100 may optionally also be provided with a lower layer 160 which may be provided as a solid layer 160 and may not comprise a lattice structure. Lower layer 160 may comprise openings, e.g. as will be described with reference to FIGS. 2A-C. Lower layer 160 may be provided to control the amount of fluid, e.g. humidity and/or air that may enter lattice structure 110. Moreover, it may increase the torsional and bending stability of sole 100. Lower layer 160 may for example be manufactured from a foil or sheet, or it may be integrally fabricated with lattice structure 160. Lower layer 160 may be designed as an outsole.

An exemplary thickness profile of midsole 100, and in particular of lattice structure 110 is shown in the side view of FIG. 1C. The thickness profile of lattice structure 110 may coarsely be divided into four regions. In a forefoot region 171, which extends from the front tip of sole 100—or from the rear end of front portion 150, if provided—towards the beginning of the metatarsals, the thickness of the lattice structure may increase towards the rear side of sole 100. For example, the thickness may increase from 2 mm-10 mm, e.g. 3 mm-8 mm, or approximately 5 mm, to 5 mm-20 mm, e.g. 7 mm-15 mm, or approximately 10 mm. Additionally or alternatively, sole 100 may be slightly inclined upwards in forefoot region 171, e.g. in order to follow the anatomy of a human foot. The thickness may further increase towards the rear side of sole 100 within a midfoot region 172. Midfoot region 172 may be adjacent to forefoot region 171 and extend to the beginning of heel region 173. The thickness of lattice structure 110 may increase to 10 mm-40 mm, e.g. 15 mm-30 mm, or approximately 25 mm. The reduced thickness of lattice structure 110 in forefoot region 171 and in midfoot region 172 may assist the rolling motion of the foot in these regions. In heel region 173, the thickness of lattice structure 110 may be approximately constant. The increased thickness of lattice structure 110 in heel region 173 may reflect the fact that most of a wearer's weight is supported in this region, and it may contribute to limit the degree of vertical deformation of sole in this region. In a rear region 174, the thickness of the lattice structure may reduce slightly, e.g. to 8 mm-35 mm, e.g. 10 mm-30 mm, e.g. approximately 20 mm. The reduced thickness in rear region 174 may support the rolling motion of the heel when contacting the ground, e.g. during running. In other examples, however, the thickness may remain constant also in rear region 174.

Sole 100, and/or its lattice structure 110, and/or its heel element 120, and/or its base portion 130, and/or its solid rim element 140, and/or its front portion 150, and/or its lower layer 160 may all be integrally fabricated using additive manufacturing. As an example, laser sintering, e.g. selective laser sintering or more generally 3D-printing may be used to manufacture sole 100. Generally, polymer materials may be used as base materials. For example, TPU (e.g. TPU available under the commercial name Desmosint X92A-1) or PEBA (e.g., PEBA available under the commercial name Evonik Vestosint x2611 SoftTouch) may be used, and they have shown to provide good stability and longevity. Also reclaimed polymer material, for example reclaimed from an ocean may similarly be used.

Concerning lattice structure 110, it may be formed by a plurality of struts arranged to form a plurality of cell elements 191. The geometry of the respective struts (e.g. thickness, length etc.) may be modified to alter the geometry of the respective cell elements. The cell elements 191 may be arranged at regular cell sites. The thickness of the struts may range from 0.5 mm to 4 mm, and may comprise e.g. approximately 1.2 mm to 1.6 mm or approximately 1.8 mm to 2.2 mm. The struts may have a uniform thickness throughout the lattice structure. Alternatively, local thickenings may be provided, e.g. at the intersections of the various struts, as exemplarily shown in the example of FIG. 1C. In some examples, also struts with different thicknesses or struts with varying thickness may be used. Typical weights of a midsole such as depicted in FIGS. 1A-C for standard sizes (e.g. European shoe sizes 40-45) range within 80 g and 200 g depending on the exact geometry of the lattice structure as well as the presence and design of possible further components of the sole as explained above.

Each cell element 191 may have a nucleus, which may be formed approximately at the center of each cell element 191. The nucleus may be created by the intersection of several struts of a cell element 191. As mentioned, the struts may be thickened, e.g. at the intersections, such that a more pronounced nucleus may be provided. For example, the stability of lattice structure 110 may thus be increased. In other examples, nuclei may be provided in a different manner, as already explained. For example, a more complex structure may be provided approximately at the center of a cell element, e.g. as described with reference to FIG. 4.

In addition, or alternatively to the various items of sole 100, lattice structure 110 may generally also be provided with other items. For example, various design elements, e.g. stripes, may be integrally fabricated with lattice structure 110. Additionally or alternatively, also further functional elements, e.g., lace loops, may be integrally manufactured by additive manufacturing together with lattice structure 110. For example, 360° lace loops may be provided which include one or more tubes penetrating the lattice structure e.g. from its medial side to its lateral side. Moreover, stability elements, e.g. medial and/or lateral side stability elements, torsional stability elements, one or more fluid channels, etc., may be integrally fabricated with lattice structure 110. Moreover, elements for opening closing the shoe with which sole 100 is intended to be used may be integrally provided with lattice structure 110. For example, snap-fit or snap-fasten elements may be provided for that matter.

Further additionally or alternatively, lattice structure 100 may be provided with a sideways layer that may extend at least partly around the periphery of the midsole and/or the lattice structure. The sideways layer may be adapted to provide a nice hand feel of the midsole, optionally without camouflaging the lattice structure. For example, a sideways layer may be implemented as a foil or other thin layer with a lattice-like surface following the design of the lattice structure. It may also be integrally manufactured with the lattice structure. It may also serve for controlling fluid flow into the lattice structure from the sides, and e.g. have corresponding openings. The sideways layer may also prevent dirt or dust from entering the midsole from the sides.

A variety of tests have been performed with midsoles similar to that shown in FIGS. 1A-C fabricated from PEBA or TPU, respectively. These tests show that the midsoles have suitable mechanical properties under specific processing conditions and provide longevity as required for high quality shoes, e.g. running shoes.

Torsion Test

A torsion around the longitudinal axis of the midsoles by 5° was applied and the required bending moment was recorded (measurement of torsional stability). The PEBA midsoles exhibit a bending moment in the range of approximately 0.9 Nm to 1.9 Nm, e.g. about 1.4 Nm, for eversion (rotation of the bottom surface of the midsole in lateral direction) with respect to the forefoot. For inversion (rotation of the bottom surface of the midsole in medial direction) with respect to the forefoot, the bending moment is in the range of approximately 0.3 Nm to 1.3 Nm, e.g. about 0.8 Nm. For the TPU midsoles the bending moments are in the range of approximately 0.2 Nm to 1.2 Nm, e.g. about 0.6 Nm or about 0.8 Nm, for inversion, and approximately 0.2 Nm to 1.2 Nm, e.g. about 0.6 Nm or about 0.7 Nm, for eversion.

Forefoot Flex Test

Moreover, a vertical displacement with an indentor having a diameter of 15 mm was applied to a forefoot region of the midsoles and the force required to achieve a certain displacement was recorded (measurement of forefoot bending stiffness). The force was applied in a standard three-point bend test, wherein the force was applied approximately centered between two supports arranged at a distance of 80 mm between each other. The forces required for a certain displacement of the forefoot region are an approximately linear function of the displacement for the midsoles. For the PEBA midsoles, a force of approximately 100 N to 200 N, e.g. 150 N to 170 N, is required to achieve a displacement of 10 mm. For the TPU midsoles, a force of approximately 55 N to 145 N, e.g. 75 N to 95 N or 110 N to 130 N, is required for that purpose. After repeating 100 thousand cycles (which simulates a distance of 280 km ran at a speed of 14 km/h), the required force reduced only by approximately 10% to 15% e.g. 12% to 13% which is a significant improvement compared to conventional EVA midsoles (approximately 17%). The amount of plastic deformation after this large number of cycles is about 30%, comparable to common midsoles.

Midfoot Flex Test

In addition, a vertical displacement with an indentor having a diameter of 15 mm was applied to a midfoot region of the midsoles and the force required to achieve a certain displacement was recorded (measurement of midfoot bending stiffness). The force was applied in a standard three-point bend test, wherein the force was applied approximately centered between two supports arranged at a distance of 80 mm between each other. The forces required for a certain displacement of the midfoot region are an approximately linear function of the displacement for the midsoles. For the PEBA midsoles, a force of approximately 240 N to 340 N, e.g. 280 N to 300 N, is required to achieve a displacement of 10 mm. For the TPU midsoles, a force of approximately 100 N to 300 N, e.g. 135 N to 155 N or 220 N to 240 N, is required. The midfoot bending stiffness is thus higher than the forefoot bending stiffness.

Long-Term Cushioning Test

Further, the elastic displacement range when applying and releasing a vertical force of 1800 N to the heel region of the midsoles was measured after 100 thousand cycles (measurement of long-term cushioning). For the PEBA midsoles the displacement range is 1 mm-11 mm, e.g. 2 mm-5 mm, and for TPU midsoles the range is 3 mm-13 mm, e.g. 6 mm-10 mm. The plastic deformation present in the midsoles after 100 thousand cycles is comparable to that in conventional EVA midsoles. Specifically the PEBA midsoles, however, showed a higher amount of energy return.

Similarly, the long-term cushioning in the forefoot region was measured by applying a vertical force of 2000 N after 100 thousand cycles. The displacement range for the midsoles is of 1 mm-8 mm, e.g. 2.5 mm-5 mm. The plastic deformation after 100 thousand cycles is again similar to that in common EVA midsoles.

Short-Term Cushioning Test

The short-term cushioning in the rear region was measured by applying a displacement of 14 mm to the rear region located on a ground plane with an inclination of 30°. The necessary forces are in the range of 100 N to 1000 N, e.g. in the range of 150 N to 400N or in the range of 550 N to 800 N. After 100 thousand cycles, a plastic deformation of about 20% to 30% is observed.

In summary, midsole 100 may be additively manufactured in an integral manner and may provide sufficient cushioning and flexibility as well as longevity to be suitable, e.g. for high performance running shoes.

Figure 2A:
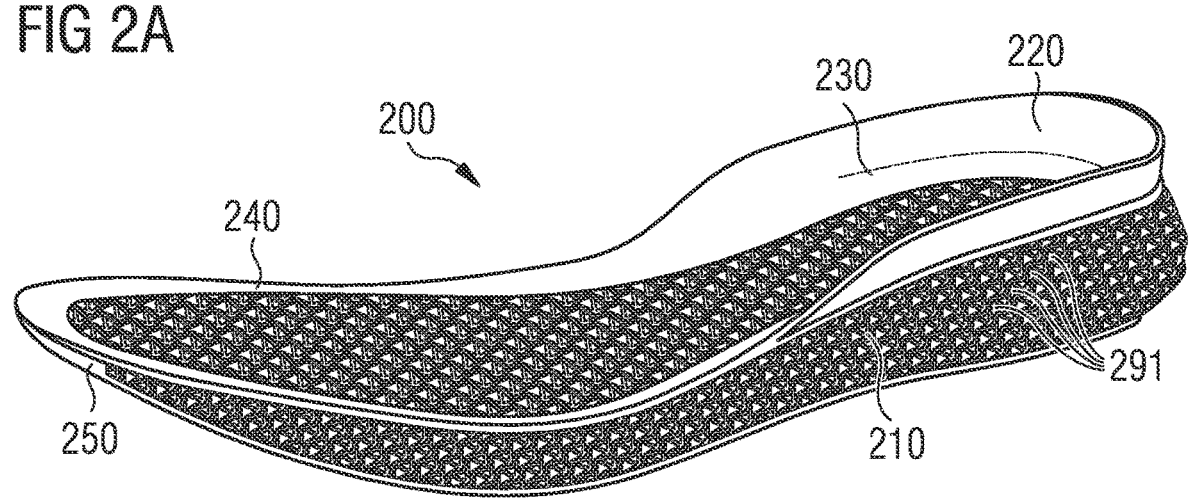
Figure 2B:
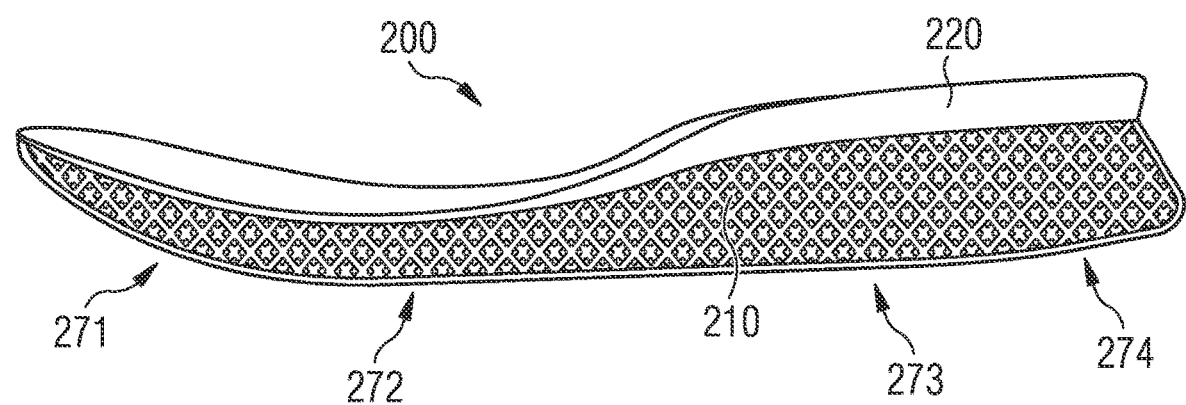
Figure 2C:
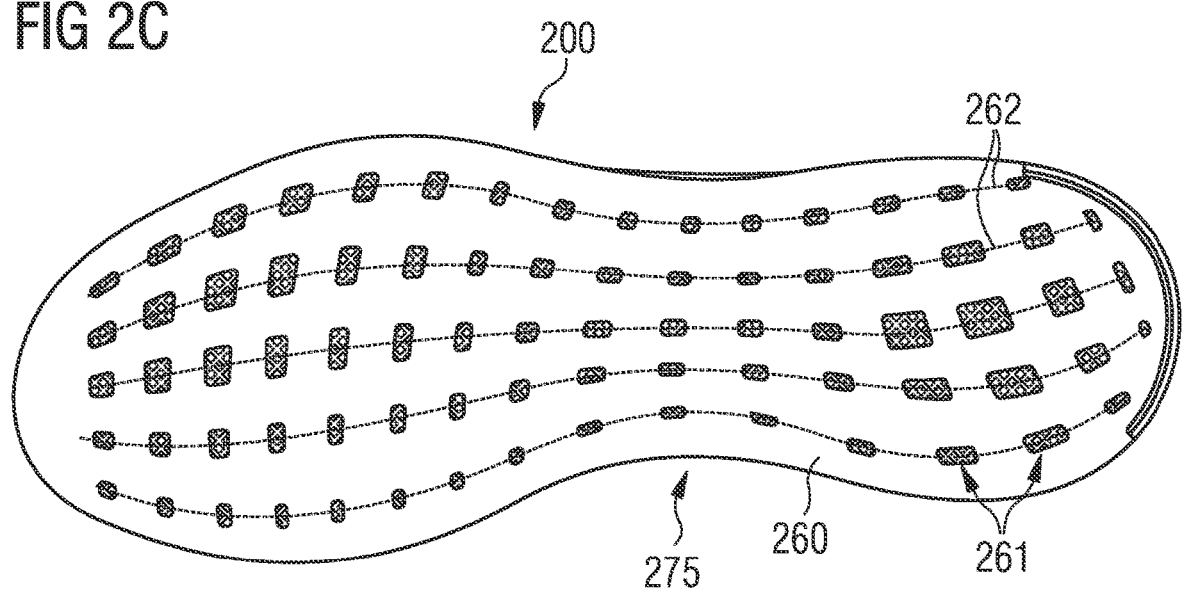

FIGS. 2A-C show perspective, side and bottom views, respectively, of a further example for a midsole 200 according to the present invention. Similarly as midsole 100, midsole 200 may comprise a lattice structure 210 with a plurality of cell elements 291, a heel element 220, a base portion 230, a solid rim element 240, a front portion 250, as well as a lower layer 260. Said items may generally be implemented and fabricated similarly as already explained with respect to FIGS. 1A-C. Moreover, midsole 200 may also comprise further elements, e.g. as described with reference to midsole 100.

As can be seen from FIG. 2A, a main difference between sole 100 and sole 200 is the design of the heel elements 120 and 220, respectively. Heel element 220 has a relatively constant height at the rear side of the heel as well as at the lateral and medial sides of the heel adjacent to the rear side. The height of heel element 220 is only reduced at its ends, both at the medial and laterals sides. Heel element 220 is nevertheless three-dimensionally formed since its cross-section increases from its top towards its bottom such that a relatively thick cross-section is provided at the interface towards base portion 230 that connects heel element 230 to lattice structure 210.

The thickness of lattice structure 210 may vary in regions 271-274 similarly as already explained with reference to regions 171-174 of sole 100. In addition, lattice structure 210 of sole 200 may have an increased thickness at the lateral side of the front region 271 and/or the lateral side of the midfoot region 272 such as to provide increased stability, there. This can be seen e.g. in the side view of sole 200 in FIG. 2B. Generally, the thickness profile as well as the entire geometry of sole 200 and in particular of lattice structure 210 may be adapted to the needs of the individual wearer, and/or the individual anatomy of his/her foot, and/or the intended use of sole 100.

FIG. 2C shows a bottom view of sole 200, which allows discerning possible details of lower layer 260. As can be seen in FIG. 2C, lower layer 260 may be provided as a solid layer with a variety of openings 261. Openings 261 may vary in size and may be adapted to the venting needs in different regions of the sole, or of the customer, or to the type of shoe with which sole 200 is intended to be used. Notably, openings 261 may be arranged along a number of lines 262. In the example of FIG. 2C, a number of five lines is provided. The lines may be undulated. However, in other examples a different number of lines, which may or may not be undulating, may be provided. The lines 262 as well as the size of the openings may be arranged such that lower layer 260 provides different degrees of stiffness in various regions. For example, in the sensitive region 275 below the arch of the foot, the openings are relatively small such that some venting is provided but the solid lower layer 260 also provides a large degree of torsional stability, there. Moreover, also the bending stiffness is reduced in region 275 below the arch of the foot to provide increased stability. The relatively large openings 261 in the forefoot and heel regions 272, 273 of sole 200 reduce the bending stiffness, there, such that the rolling motion of the foot is not hindered. In toe region 271 and rear region 274, the size of the openings may again be reduced in order to provide increased stability, there. Seen from a different perspective, the lines indicated with reference signs 262 may be considered as separating individual struts provided by the lower layer 260 that extend from the rear side possibly all the way to the front side of sole 200 such that torsion may efficiently be reduced. The positioning and shape of the lines 262 may also be adapted to counteract pronation or supination as needed for the individual wearer.

Figure 2D:
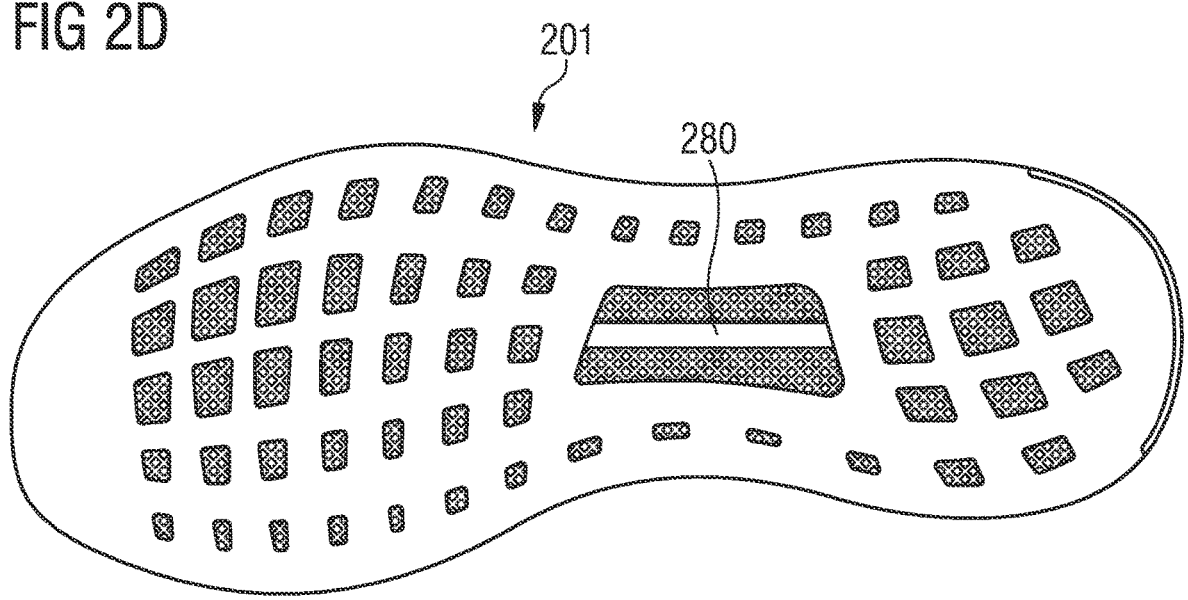

FIG. 2D shows a bottom view of a sole 201 similar to sole 200 shown in FIGS. 2A-D, wherein a torsional stability element 280 is integrally fabricated with lattice structure 210. The torsional stability element 280 may for example be provided as one or more struts with lateral dimensions of 1 mm to 40 mm, or 2 mm to 20 mm. A height of torsional stability element 280 may be similar. Torsional stability element 280 may extend at least from a heel region to a midfoot region. It may be approximately centered in lateral direction. An optional lower layer of lattice structure 201 may have an opening to make torsional element 280 visible, at least partly. The exact design and position of the torsional stability element 280 may be adjusted, e.g. as required by the individual wearer. It is also possible that the torsional stability element 280 is fabricated separately and attached to the lattice structure 210 later on.

Figure 3A:
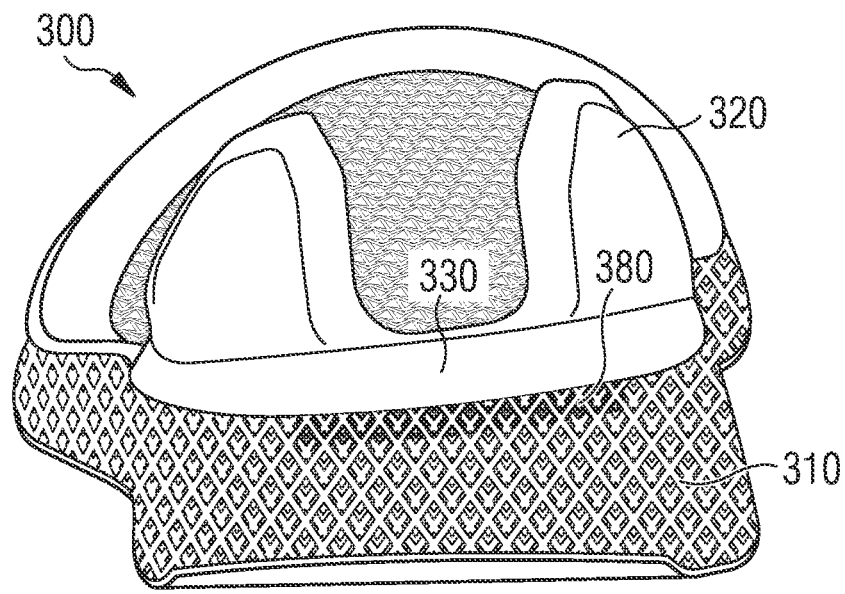
Figure 3B:
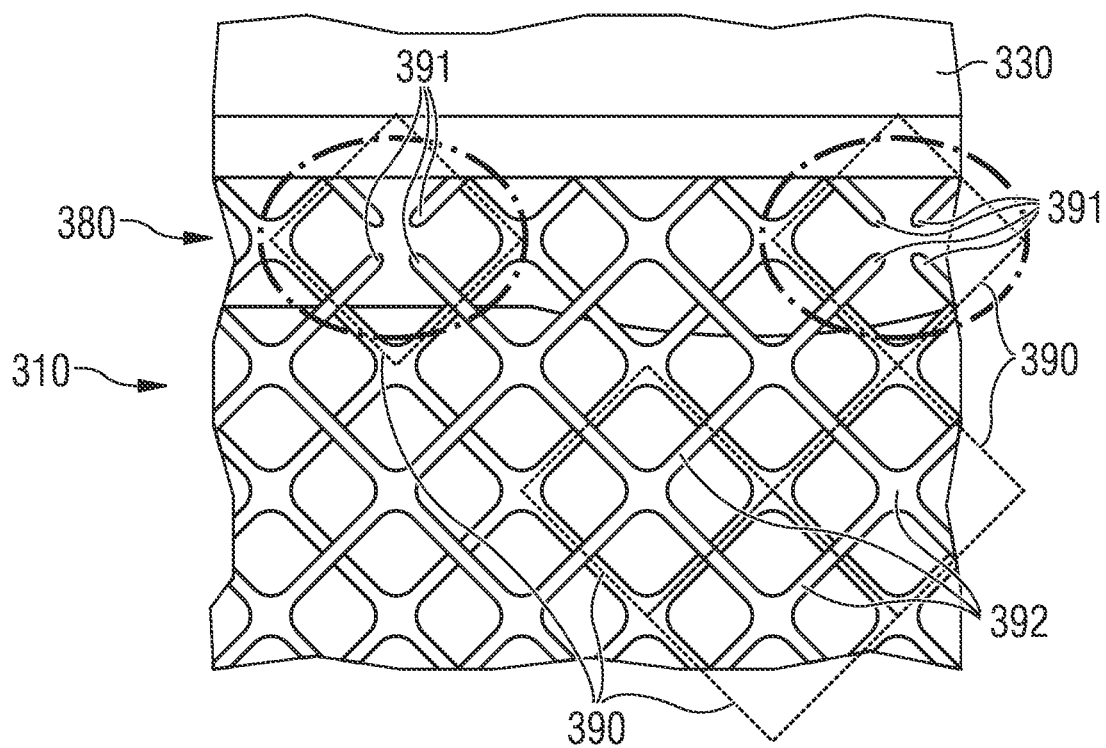

FIGS. 3A-B shows a further example for a midsole 300 according to the present invention. Midsole 300 comprises a lattice structure 310, a heel element 320 and a base portion 330. These items, and possible further items, may be implemented and fabricated e.g. as already explained with reference to FIGS. 1A-C and FIGS. 2A-C. In particular, lattice structure 310 may comprise a plurality of regularly arranged cell sites 390. For example, regularly arranged cell sites 390 may be provided in a heel region and/or a rear region and/or in other regions of lattice structure 300. A majority of the cell sites 390 within each such region may comprise interconnected cell elements 392. For example, in the example lattice structure 310, a majority of cell sites 390 in the rear region as well as the heel region, the midfoot, forefoot and toe regions comprises interconnected cell elements 392. Lattice structure 310 also comprises a subset of cell sites 390 with cell elements 391 comprising cell vacancies, which is arranged within one or more zones 380. A zone 380 may for example be arranged at a rear side of lattice structure 310, and in particular at an edge of the rear side adjacent to base portion 330. Additionally or alternatively, one or more zones 380 may also be arranged at other locations of lattice structure 310. Moreover, also zones 380, which comprise cell elements with fewer connections to at least one adjacent cell site than the majority of the cell sites, may be provided.

FIG. 3B shows a close-up view of the zone 380 depicted in FIG. 3A. The plurality of cell sites 390 of lattice structure 310 is indicated by dashed diamonds. A majority of the cell sites 390 comprises cell elements 392 that may each have a nucleus and four connecting elements providing connections to respective adjacent cell elements 392. The cell elements 392 may be formed by a plurality of struts. The struts may interconnect to each other approximately at the center of each cell site 390 and they may optionally be thickened, there. The struts may thus form a nucleus approximately at the center of each cell element 392, which, in the example of FIG. 3B, coincides with the center of each cell site 390. The portions of the struts outside of the nucleus form the connecting elements of each cell element providing the connections to the respective adjacent cell sites 390.

In zone 380, which is arranged adjacent to base portion 330, there are cell sites 390, which comprise a cell element 391 with a cell vacancy (emphasized by solid circles). For example, the struts of a cell element 391 may be arranged such that they do not interconnect to each other. No nucleus may be provided in these cell elements 391. In other words, by means of cell elements 391, cell vacancies may be intentionally provided. This is the case in both exemplary cell elements 391 shown in FIG. 3B. In other examples, a nucleus may at least partially be provided by a cell element 391. For example, at least some of the struts may interconnect to each other. Additionally or alternatively, connection elements of a cell element 391 (e.g. portions of struts) may be missing, or may comprise one or more gaps, such that cell disconnections to at least one adjacent cell are provided. Hence, less connections to at least one adjacent cell may be provided by such a cell element 391 compared to cell elements 392 which are present in a majority of cell sites 390.

In the example of sole 300, cell sites 390 are provided in rows, wherein the cell sites 390 with cell vacancies are arranged in that row which is adjacent to base portion 330. Specifically, every second cell site 390 in that row is implemented with a cell vacancy. In other examples, cell sites with vacancies may be arranged differently. In particular, only every third cell site in a specific row may be implemented with a vacancy or cell sites with vacancies may be dispersed even more scarcely and/or with a varying density. In addition or alternatively, cell sites in rows other than that adjacent to base portion 330 may be provided with vacancies, e.g. a second, third, etc. row. Moreover, it is understood that cell sites with vacancies need not be arranged according to rows, and generally also cell sites in general need not be arranged in rows. In some examples—additionally or alternatively to cell sites with vacancies—cell sites with cell elements may be provided, wherein the cell elements comprise fewer connections to at least one adjacent cell site than the majority of the cell sites. For example, instead of cell sites 390 with cell elements 391 with vacancies in the example of FIG. 3B, it would be possible to provide cell sites with cell elements having only three, two or a single connection with adjacent cell elements, e.g. by providing only three, two or a single strut at such a cell element, or correspondingly only three, two or a single strut without any gap.

Zone 380 may provide a smooth transition from base portion 330 to lattice structure 310, which may also provide an aesthetic outer appearance) and may create a less abrupt change from the solid material of base portion 330 to lattice structure 310. Hence, strains of lattice structure 310, in particular of struts of lattice structure 310, may be reduced. Zone 380 enables the creation of a gradient from solid base portion 330 to lattice structure 310. The cell vacancies (or reduced number of interconnections) provided by cell elements 391 allow to selectively reduce the stiffness provided by the lattice structure 310 at specific cell sites 390. This may allow for a smoother force transfer from base portion 330 to lattice structure 310 such that lattice structure 310 may break less easily.

In some examples, a graded degree of stability may be provided in a transition zone, e.g. on a rear side of lattice structure 310, at that edge of lattice structure 310 that faces base portion 330. For example, the density of cell sites 390 with vacancies (or a reduced number of connections to at least one adjacent cell site) provided by cell elements 391 may increase through such a transition zone such that a graded degree of stability may be provided in the transition zone between lattice structure 310 and base portion 330. For example, the stability may decrease closer towards the base portion 330. In some examples, also the number of connections to adjacent cell sites 390 provided by cell elements 391 may be reduced along a transition zone. For example, three interconnections may be provided at cell sites 390 farther away from base portion 330, whereas only two or one connections may be provided at cell sites 390 closer to base portion 330. It is noted that a transition zone and or a zone 380 may be provided in the mentioned regions of the respective lattice structure irrespective of the optional presence of a heel element.

It is noted that for ease of illustration, in FIG. 3B a cell site 390 comprises only four connections to adjacent cell sites 390, which are arranged within the same plane. In other examples, a different number, in particular a larger number of connections may be provided, and the connections of a cell site with its adjacent cell sites may also be arranged such that they do not all lie within the same plane. For example, a majority of cell sites may comprise cell elements with eight interconnections to adjacent cell sites, whereas cell sites of a subset may comprise cell elements with only seven or less interconnections to adjacent cell sites (and/or cell vacancies may be provided at cell sites of the subset). Moreover, it is understood that also soles 100 and 200 may comprise one or more zones as explained with reference to sole 300.

Figure 4:
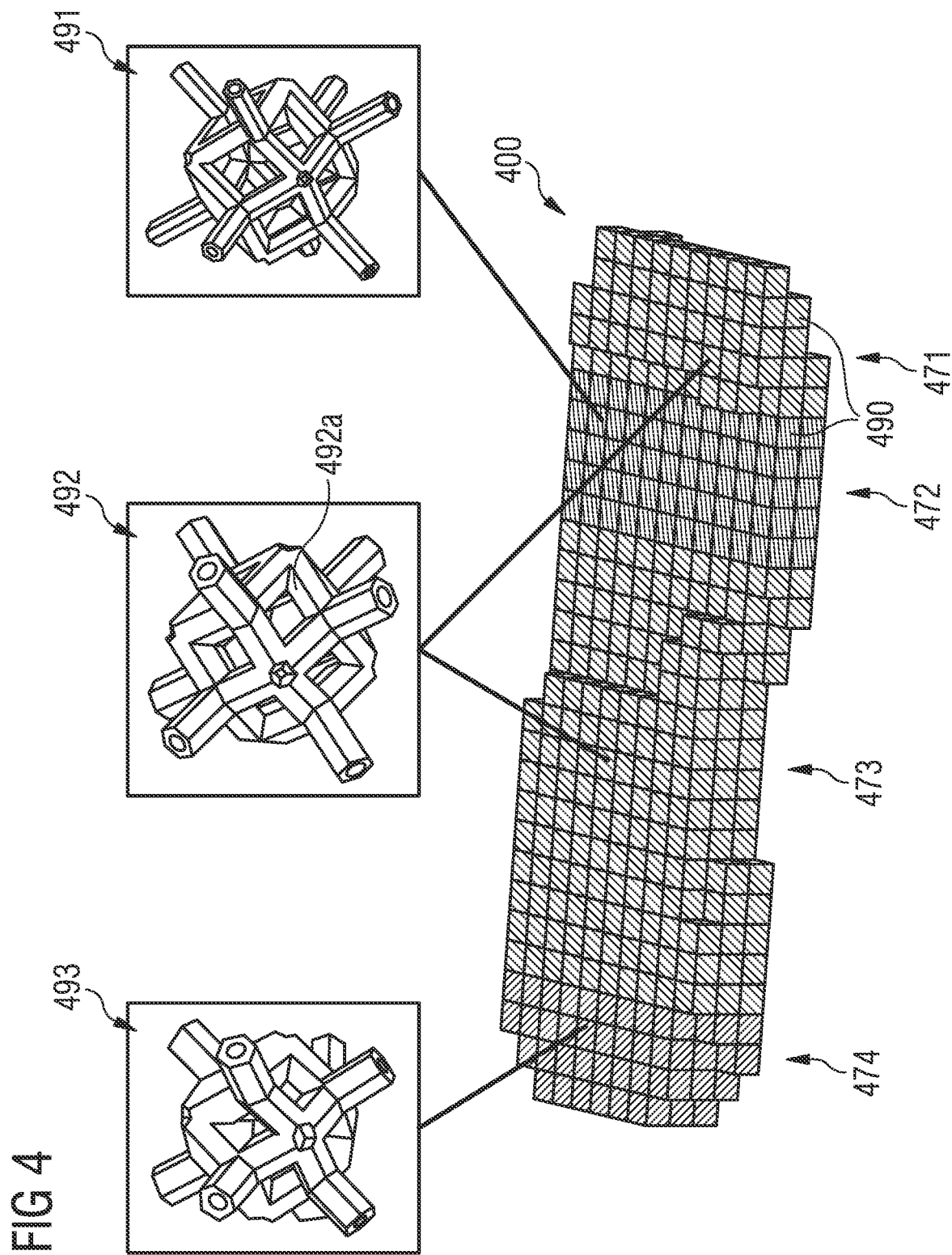
FIG. 4 shows aspects of a lattice structure for a midsole according to some embodiments.

FIG. 4 shows a further example for a lattice structure 400 for a sole according to the present invention. Generally, lattice structure 400 may be implemented and fabricated as explained with reference to the previous figures. Lattice structure 400 comprises a forefoot portion 471, a metatarsal region 472, a region under the arch of the foot 473, and a rear region 474. As can be seen, lattice structure 400 comprises a plurality of cell sites 490. In the rear region 474, three layers of cell sites 490 are provided. A front portion of region 473 comprises two layers whereas a rear portion of region 473 also comprises three layers. In the metatarsal region 472, two layers of cell sites 490 are provided. The forefoot region 471 comprises three layers, which, however, do not extend across the entire forefoot region 471. For example, the top layer is only arranged in a front portion of forefoot region 471, whereas the bottom layer is only arranged in a rear portion of forefoot region 471. The cell sites are arranged equidistantly in the example of FIG. 4 such that a different number of layers leads to a different thickness. In other examples, other numbers of layer may be provided in the various regions.

Moreover, the properties of one or more layers may vary. For example, a thickness of a layer may increase or decrease within a certain region or may be different in different regions, e.g. in order to provide a thickness profile, for example such as explained with reference to FIGS. 1A-C. In some examples, cell sites 490 may be arranged at least in part such that these are not equidistant. This may allow controlling the thickness of lattice structure 400 independently from the numbers of layers, as well as the properties provided by a continuous layer in different regions.

Cell sites 490 in regions 471 and 473 each comprise a cell element 492. Cell elements 492 may generally be provided by a plurality of struts (bar-like or tube-like elements). For example, a plurality of struts may be arranged to form a dodecahedron (e.g. rhombic), a tetrahedron, an icosahedron, a cube, a cuboid, a prism, a parallelepiped etc. This basic geometric design and its interior may be considered as the nucleus 492a of each cell element 492. Further, additional struts or additional portions of struts may be provided to form connections with respective adjacent cell elements. For example, eight connections may be provided by cell element 492. In other examples, four, six, eight, twelve or any other number of connections may be provided. The volume occupied by a single cell site or a single cell element may be 3 mm$^3$-30 mm$^3$, 5 mm$^3$-20 mm$^3$, 7 mm$^3$-15 mm$^3$, or 8 mm$^3$-12 mm$^3$.

Cell sites 490 in region 472 comprise cell elements 491. These may be similar to cell elements 492. However, the thickness of their struts may be reduced with respect to those of cell elements 491. In particular, their thickness may be reduced by approximately 75-85%, e.g. 80%. Similarly, rear region 474 may comprise cell elements 493 with a strut thickness, which is increased by approximately 115-125%, e.g. 120%. Hence, the density and therefore also the weight, stiffness and cushioning provided by lattice structure 400 in its various regions may be varied. Density variations in the range of −20% to +20% have turned out to allow for significant variations and at the same time for a homogenous feel and sufficient longevity of lattice structure 400.

In general, lattice structure 400 may be divided into any number of different regions as needed, and in particular, as specified for each individual wearer. For example, a three-dimensional scan of a foot may be performed and the arrangement of cell sites 490 and the grouping of these cell sites 490 into different regions may be carried out correspondingly. The design of the regions and their cell elements may take into account the anatomy of the wearer, e.g. his/her weight, whether he/she tends to pronate or supinate etc. Further, the design of the regions, as well as of the cell elements within each region may be adapted according to the specific type of sports the sole is to be used for. For example, the lattice structure may specifically be adapted to provide lateral stability for lateral sports, such as e.g. basketball. As a result, lattice structure 400 may be customized as needed. Moreover, the lattice structure may be adapted for different shoe sizes such that—irrespective of the size of the shoe—the same mechanical properties may be provided by the lattice structure.

Lattice structure 400 may also be provided with one or more items as described with reference to FIGS. 1A-C and FIGS. 2A-C as well as with aspects described with reference to FIGS. 3A-B. It is noted that also the lattice structures 110, 210 and 310 may generally be provided with aspects described with reference to lattices structure 400.

Figure 5:
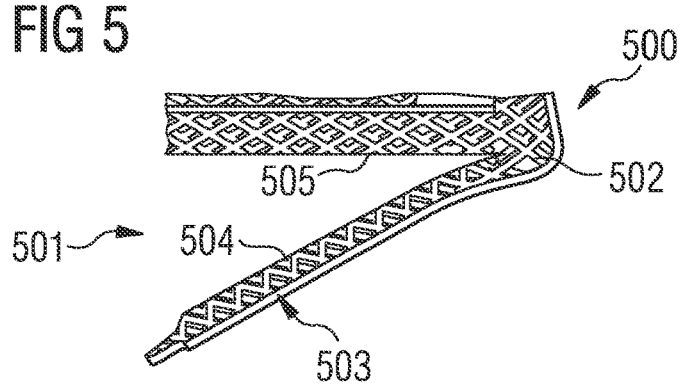
FIG. 5 shows aspects for a separately additively manufactured lattice structure with a receptacle according to some embodiments.

FIG. 5 shows an example for an additively manufactured lattice structure 500 with a receptacle 501 according to the present invention. Lattice structure 500 comprises a plurality of cell sites that may be adapted e.g. as described with reference to the previous figures. In particular, lattice structure 500 may be integrally fabricated by additive manufacturing.

Lattice structure 500 may comprise one or more receptacles 501. One or more functional elements that may be fabricated separately from lattice structure 500, e.g. by additive manufacturing or any other manufacturing method, and that may be mechanically attached to one or more receptacles 501. A receptacle 501 may comprise a joint 502 around which a flap element 503 may be rotated. Flap element 503, in particular a surface of flap element 503 facing a main portion of lattice structure 500, may comprise one or more snap-fit and/or snap-fasten elements 504. Snap-fit and/or snap-fasten elements 504 may snap into one or more corresponding snap-fit and/or snap-fasten elements 505 that may be arranged at a surface of the main portion of lattice structure 500 facing flap element 503. Flap element 503 may also be connected to the main portion of lattice structure 500 without a joint 502.

Although not shown in FIG. 5, one or more receptacles 501 may for example be used to mechanically attach a torsional stability element to the lattice structure 500. Hence, such separately fabricated functional elements may be safely attached to lattice structure 500 mechanically, e.g. without using any glue or adhesive. Hence, the integrity of lattice structure 500 may not be compromised by adhesive or glue entering the lattice structure 500 while gluing separate elements to it. Instead, separate elements may be mechanically attached as needed. For example, snap-fit or snap-fasten elements 505, 504 may be adapted to allow a releasable attachment such that the functional elements attached to the receptacle may be interchanged, e.g. by the wearer, as needed.

Lattice structure 500 may be fabricated using similar methods and materials as described with reference to the previous figures. Finally, it is noted that also lattice structures 110, 210, 310 and 400 described with respect to the previous figures may be combined with one or more receptacles and the related aspects described with reference to FIG. 5.

Figure 6A:
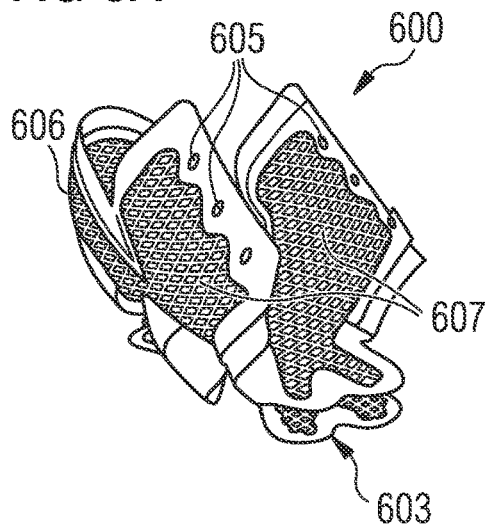
Figure 6B:
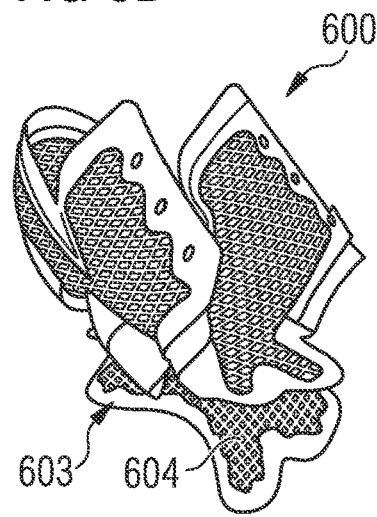
Figure 6C:
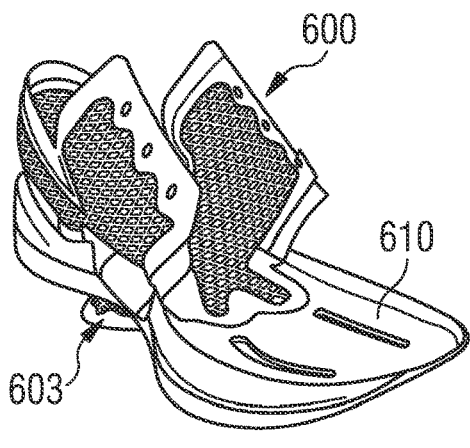

FIGS. 6A-D show an example for a separately manufactured functional element 600. Functional element 600 may be fabricated by additive manufacturing or any other manufacturing method. Functional element 600 may be mechanically attached to a midsole 610 as shown in FIG. 6C. Midsole 610 may be designed as any of the midsoles described herein and may comprise in particular comprise a lattice structure 110, 210, 310, 500 as described. Alternatively, the midsole 610 could also be designed as a solid midsole, e.g. made of EVA, TPU or the like. In the example according to FIGS. 6A-D, the functional element 600 itself comprises one or more receptacles 608. A receptacle 608 may comprises a joint 602 around which a flap element 603 may be rotated.

Figure 6D:
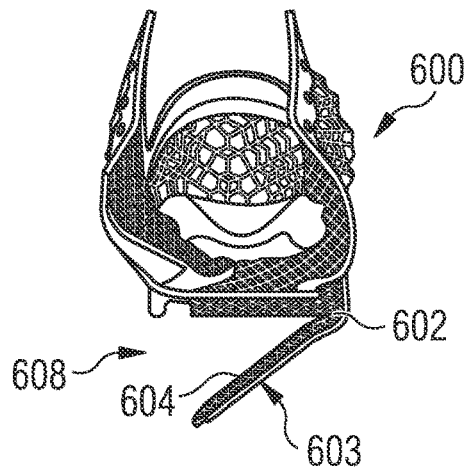

FIG. 6A shows the functional element 600 with the flap element 603 in a closed position. FIG. 6B and FIG. 6D show the flap element 603 in an open position. FIG. 6C shows the functional element 600 attached to the midsole 610. In the attached positon according to FIG. 6C, the flap element 603, in particular a surface of flap element 603 faces and attaches to midsole 610. In FIG. 6C, a possible lattice structure of the midsole 610 is not shown for the sake of simplicity. The flap element 603 may comprise one or more snap-fit or snap-fasten elements 604 which may snap into one or more corresponding snap-fit or snap fasten elements that may be arranged at a surface of midsole 610, in particular of the lattice structure of midsole 610, facing flap element 603 in the attached position. Flap element 603 may also be attached to the midsole 610 without a joint 602.

The functional element shown in FIGS. 6A-D may be used to provide one or more lace loops 605, one or more heel elements 606, one or more lateral support elements 607 or other elements to support an upper of a shoe.

FIGS. 7A-B show a further example for a sole 700 according to the present invention which may be implemented as a midsole. Sole 700 may comprise a lattice structure 710, as well as a heel element 720, and/or a lower layer 760. These items may be provided as explained in other examples. Moreover, sole 700 may comprise further items, as described herein, which are not shown in FIGS. 7A-B for sake of simplicity.

Sole 700 may comprise one or more openings 761. Openings 761 may be arranged at a bottom surface of lattice structure 710, e.g. to provide air permeability. Openings 761 may be designed as openings in lower layer 760 of lattice structure, but may also be designed differently.

Sole 700 comprises one or more moveable elements 750. The movable elements may be arranged, at least partly, at a bottom side of the sole 700. For example, moveable elements 750 may be provided to cover one or more of openings 761, when in a first position (cf. FIG. 7B). Moveable elements 750 may be moved, e.g. by the wearer, into at least one second position (cf. FIG. 7A), in which these are at least partly removed from one or more of openings 761. The first position may be within a midfoot region. The moveable elements 750 may be moved by a lever 751, more generally a moveable control element 751, which may be moved from a first position into at least one second position such that the moveable elements 750 are brought from the first position to the at least one second position. The moveable control element may be provided at a medial, lateral, front, and/or rear side of sole 700 such that a wearer can conveniently access it. By moving the moveable elements 750, the breathability of sole 700 may be altered. Hence, sole 700 may be repeatedly adjusted by the wearer as needed.

It is noted that moveable elements 750 may also be provided without openings 761. For example, moveable elements may be moved from a first position, in which these cover a larger area into a second position in which cover a smaller area, e.g. they may at least partially overlap in the second position. Moreover, other control elements than moveable control element 751 may be provided, e.g. by means of a push-button etc.

By means of one or more moveable elements 750, the breathability of the sole 700, e.g. at its bottom surface, may be reproducibly altered, for example between two or more levels, or continuously. For example, a breathability in a midfoot region may thus be modified.

FIG. 8 shows a portion of a further example for a lattice structure 800 that may be used with the aspects disclosed herein. Lattice structure 800 comprises a plurality of cell elements and may generally be designed as the lattice structures explained heretofore. It may in particular comprise optional aspects of the lattice structures explained heretofore. FIG. 8 specifically serves to illustrate that generally the density of the lattice structure may be varied in different zones of the lattice structure and/or zones of the sole, respectively.

Lattice structure 800 comprises a zone 820 with an average density that is above that of lattice structure 800. Zone 820 may be arranged adjacent to top surface 802 of lattice structure 800.

Optionally, a zone 810 of lattice structure 810 may be provided with an average density that is below an average density of lattice structure 800, and zone 810 may be arranged adjacent to bottom surface 801 of lattice structure 800. In other examples zone 810 and/or zone 820 may be arranged differently.

In some examples, lattice structure 800 comprises a plurality of layers, and zone 820 may comprise one or more highest layer of lattice structure 800. Optional zone 810 may correspondingly comprise one or more lowest layer of lattice structure 800. In some examples, zone 820 (and/or optional zone 810) may extend essentially along the entire top surface 820 (and/or bottom surface 802, respectively) of sole 800.

In some examples, zone 820 (and/or optional zone 820) is arranged along the perimeter of sole 800, e.g. circumscribing a heel region of sole 800 or entire sole 800. Zone 820 arranged along the perimeter of sole 800 may help to provide selectively increased stability in this region. For example, when sole 800 is combined with a rim element for attachment to an upper, zone 820 may help to provide a smooth transition between the (typically solid) upper and the (typically) more refined lattice structure 800. The forces may be gradually guided into the interior as well as lower part of the lattice structure 800 around its perimeter by means of denser, e.g. stronger, zone, such that the risk of breakage is reduced.

Lattice structure 800 may comprise a plurality of struts, which form a plurality of cell elements. The struts may generally comprise local thickenings at the interconnections of different struts with each other. Moreover, the thickness of the struts may vary within lattice structure 800. The thickness of the struts may generally increase from bottom surface 801 of lattice structure 800 towards top surface 802 of lattice structure 800.

Zone 820 may comprise struts with an average thickness that is increased compared to an average strut thickness of lattice structure 800. Optional zone 810 may comprise struts with an average thickness that is reduced compared to an average strut thickness of lattice structure 800. For example, the average thickness of zone 820 may be increased by 10% to 500%, or by 20% to 400%, or by 30% to 300% with respect to an average thickness of the lattice structure. In other examples, other ranges may be used. The average thickness of zone 810 may be correspondingly reduced.

FIG. 9 shows a further embodiment of a sole 900 according to the present invention. It may comprise a midsole with a lattice structure 910, and a heel element, which may all be generally designed as explained heretofore. Moreover, sole 900 may comprise an outsole 950, which may be integrally fabricated together with lattice structure 910 or fabricated separately. Sole 900 may further comprise any further items as described herein.

Specifically, sole 900 may be designed such as to provide a plurality of regions with different functionality. For example, lattice structure 910 may be adapted to provide optimized cushioning properties particularly in a toe region 942 and in region 941, which comprises a midfoot region and also extends around the periphery of the heel region. Lattice structure 910 may moreover be optimized for providing high energy return in a forefoot region 921 as well as in a central heel region 922. A medial region 930 of lattice structure as well as the heel element three-dimensionally encompassing the heel may be adapted to provide optimized stability of sole 900. Moreover, outsole 950 may be provided such that the traction provided by sole 900 is optimized. In other examples, the various regions may be arranged differently and/or other regions may be provided.

Lattice structure 910 may be designed differently in various aspects, as explained herein, in different regions, e.g. regions 921, 922, 930, 941, 942, such that different properties are provided there. The sole may be optimized as needed in these regions. In particular, different properties may e.g. be provided by cell sites (or corresponding cell elements) with cell disconnections and/or cell vacancies, and/or by using varying geometries of the cell elements at the cell sites

What is claimed is:

1. An additively manufactured sole for a sports shoe, comprising:
   a lattice structure comprising a plurality of cell sites defined by a first subset of cell elements and a second subset of cell elements;
   a heel element; and
   a base portion connecting the heel element to the lattice structure,
   wherein each cell element of the first subset of cell elements comprises a first plurality of connecting elements connected to one another at a nucleus,
   wherein each cell element of the second subset of cell elements comprises a second plurality of connecting elements, wherein one or more connecting elements of the second plurality of connecting elements are not connected at a nucleus, and
   wherein the second subset of cell elements is arranged in one or more layers adjoining the base portion, and wherein the second subset of cell elements is arranged closer to the base portion than the first subset of cell elements such that a stability of the lattice structure is lower at the second subset of cell elements.

2. The sole of claim 1, wherein each cell element of the second subset of cell elements is connected to a cell element of the first subset of cell elements.

3. The sole of claim 1, wherein a density of cell elements that have one or more connecting elements not connected at a nucleus increases toward the base portion.

4. The sole of claim 1, wherein the lattice structure comprises an alternating arrangement of cell elements having connecting elements connected to one another at a nucleus and cell elements having one or more connecting elements that are not connected at a nucleus.

5. The sole of claim 1, wherein each of the plurality of cell sites comprises the same geometry.

6. The sole of claim 1, wherein each of the first plurality of connecting elements comprises a strut.

7. The sole of claim 1, wherein each of the first plurality of connecting elements comprises a thickness, and wherein the thickness increases at the nucleus.

8. An additively manufactured sole, comprising:
a lattice structure comprising a plurality of cell sites defined by a first subset of cell elements and a second subset of cell elements;
a heel element; and
a base portion connecting the heel element to the lattice structure,
wherein each of the first subset of cell elements comprises a nucleus and a first number of connecting elements extending from the nucleus,
wherein each of the second subset of cell elements comprises a nucleus and a second number of connecting elements extending from the nucleus, wherein the second number of connecting elements is less than the first number of connecting elements, and
wherein the second subset of cell elements is arranged in one or more layers adjoining the base portion, and wherein the second subset of cell elements is arranged closer to the base portion than the first subset of cell elements such that a stability of the lattice structure is lower at the second subset of cell elements.

9. The sole of claim 8, wherein the connecting elements extending from the nucleus of the cell elements of the first subset of cell elements are struts.

10. The sole of claim 8, wherein the nucleus each of the first and second subsets of cell elements is arranged at a center of a cell site.

11. The sole of claim 8, wherein each of the cell elements of the first subset of cell elements has a first shape, and wherein each of the cell elements of the second subset of cell elements has a second shape, and wherein the first shape is the same as the second shape.

12. The sole of claim 8, wherein each cell element of the first subset of cell elements comprises a dodecahedron.

13. The sole of claim 8, wherein the first number of connecting elements is eight.

14. The sole of claim 8, wherein the second number of connecting elements comprises one to three connecting elements.

15. A shoe, comprising:
an upper; and
a midsole connected to the upper, wherein the midsole comprises:
a lattice structure comprising a plurality of cell sites defined by a first subset of cell elements and a second subset of cell elements;
a heel element; and
a base portion connecting the heel element to the lattice structure,
wherein each cell element of the first subset of cell elements comprises a first plurality of connecting elements connected to one another at a nucleus,
wherein each cell element of the second subset of cell elements comprises a second plurality of connecting elements, wherein one or more of the second plurality of connecting elements are not connected at a nucleus, and
wherein the second subset of cell elements is arranged in one or more layers adjoining the base portion, and wherein the second subset of cell elements is arranged closer to the base portion than the first subset of cell elements such that a stability of the lattice structure is lower at the second subset of cell elements.

16. The shoe of claim 15, wherein the upper comprises a knit upper.

17. The shoe of claim 16, wherein the knit upper comprises a yarn comprising a reclaimed polymer.

18. The shoe of claim 15, wherein the midsole further comprises a solid rim element, and wherein the upper is connected to the midsole at the solid rim element.

19. The shoe of claim 15, further comprising an outsole connected to the midsole.

20. The shoe of claim 19, wherein the midsole and the outsole are integrally additively manufactured.

* * * * *